US011372758B2

(12) United States Patent
Abed et al.

(10) Patent No.: US 11,372,758 B2
(45) Date of Patent: Jun. 28, 2022

(54) DYNAMIC RECONFIGURABLE MULTI-LEVEL CACHE FOR MULTI-PURPOSE AND HETEROGENEOUS COMPUTING ARCHITECTURES

(71) Applicant: Jackson State University, Jackson, MS (US)

(72) Inventors: Khalid Abed, Madison, MS (US); Tirumale Ramesh, Chantilly, VA (US)

(73) Assignee: Jackson State University, Jackson, MS (US)

( * ) Notice: Subject to any disclaimer, the term of this patent is extended or adjusted under 35 U.S.C. 154(b) by 37 days.

(21) Appl. No.: 16/872,409

(22) Filed: May 12, 2020

(65) Prior Publication Data

US 2021/0357328 A1    Nov. 18, 2021

(51) Int. Cl.
*G06F 12/0811*    (2016.01)
*G06F 12/121*    (2016.01)

(52) U.S. Cl.
CPC ........ *G06F 12/0811* (2013.01); *G06F 12/121* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 10,102,149 B1* | 10/2018 | Appu | ................... | G06T 1/60 |
| 2008/0229024 A1* | 9/2008 | Plamondon | ............ | H04L 67/28 |
| | | | | 711/126 |
| 2009/0328047 A1* | 12/2009 | Li | ................... | G06F 9/5044 |
| | | | | 718/102 |
| 2012/0210066 A1* | 8/2012 | Joshi | ................... | G06F 12/0811 |
| | | | | 711/118 |
| 2013/0086324 A1* | 4/2013 | Soundararajan | .... | G06F 12/0811 |
| | | | | 711/122 |
| 2014/0019708 A1* | 1/2014 | Erdmann | ............. | G06F 9/5016 |
| | | | | 711/172 |
| 2015/0032962 A1* | 1/2015 | Buyuktosunoglu | ....................... | |
| | | | | G06F 12/0811 |
| | | | | 711/122 |
| 2017/0177492 A1* | 6/2017 | Loh | .................. | G06F 12/084 |
| 2019/0205262 A1* | 7/2019 | Ros | ................... | G06F 12/1045 |
| 2021/0034366 A1* | 2/2021 | Wallach | ............. | G06F 9/30189 |

* cited by examiner

*Primary Examiner* — William E. Baughman
(74) *Attorney, Agent, or Firm* — Butler Snow LLP

(57) ABSTRACT

Embodiments of a system for dynamic reconfiguration of cache are disclosed. Accordingly, the system includes a plurality of processors and a plurality of memory modules executed by the plurality of processors. The system also includes a dynamic reconfigurable cache comprising of a multi-level cache implementing a combination of an L1 cache, an L2 cache, and an L3 cache. The one or more of the L1 cache, the L2 cache, and the L3 cache are dynamically reconfigurable to one or more sizes based at least in part on an application data size associated with an application being executed by the plurality of processors. In an embodiment, the system includes a reconfiguration control and distribution module configured to perform dynamic reconfiguration of the dynamic reconfigurable cache based on the application data size.

20 Claims, 16 Drawing Sheets

Multi-Level Dynamic Reconfigurable Cache System Overview

Generalized Local Cache Sizing $\frac{1}{k1}$ - distribution size factor from S2 to S1 and $\frac{1}{k2}$ - distribution size factor from S3 to S2 b2 - Bandwidth degradation attributed to slower memory technology blocks distributed from L3

Generlized Cache Sizing Distribution

Illustrated Cache Sizing for Future Memory Technology Growth

Reconfigurable Interconnection for Distributed Cache Sizing

Illustrated L1 Cache Memory Cells

Illustrated L2 Cache Memory Cells

Illustrated L3 Cache Memory Cells

L1 Maximum Loadable Capacity - N1
L2 Maximum Loadable Capacity - N2
L3 Maximum Loadable Capacity - N3

| for $0 \leq D \leq N1$ | for $N1 \leq D \leq N2$ | for $N2 \leq D \leq N3$ | for $D > N2$ |
|---|---|---|---|
| $S1 = [D/n1] * n1$ | $S1 = 2(n1)$ | $S1 = 2(n1)$ | $S1 = 2(n1)$ |
| $S2 = 2(n2)$ | $S2 = [D/n2]*n2$ | $S2 = 2(n2)$ | $S2 = N2$ |
| $S3 = 2(n3)$ | $S3 = 2(n3)$ | $S3 = [D/n3]*n3$ | $S3 = N3$ |
| 124 | 125 | 125a | 126 |

Generalized Local Cache Sizing Equations $$S1\_D = S1 + \frac{1}{k1} S2$$

$$S2\_D = S2 - \frac{1}{k1} S2 + \frac{1}{k2} S3$$

$$S3\_D = S3 - \frac{1}{k1} S3$$

$\frac{1}{k1}$ distribution size factor from S2 to S1 and $\frac{1}{k2}$ distribution size factor from S3 to S2

Generalized Distributed Cache Sizing Equations

Reconfigurable Local Cache Sizing Illustration for Processor Bandwidth using Sizing Equations given in Figure 10

Cumulative Cache Sizing Illustration for Processor Bandwidth

Blocks Per Set = r
Select no. of Sets q = S/r * B such that S/B ≥ 1
Total no. of Cells = S/m Generalized Cache Association Vector Illustration of L1 Cache Association and Replacement Policy Illustration of L2 Cache Association and Replacement Policy Cache Association Generation Cache Cells Set and Block Connectivity Symbols for Cache Association Generalized Set Allocation and Block Allocation Connectivity for
Loaded Cache Memory Cells Illustrated Set Allocation Connectivity for L1 Loaded Cache Memory Cells

|        | C1-s1 | C2-s1 | C3-s1 | C4-s1 | C5-s1 | C6-s1 | C7-s1 | C8-s1 |
|--------|-------|-------|-------|-------|-------|-------|-------|-------|
| C9-s2  | 12    | 10    | 10    | 10    | 10    | 10    | 10    | 6     |
| C10-s2 | 8     | 0     | 0     | 0     | 0     | 0     | 0     | 0     |
| C11-s2 | 8     | 0     | 0     | 0     | 0     | 0     | 0     | 0     |
| C12-s2 | 8     | 0     | 0     | 0     | 0     | 0     | 0     | 0     |
| C13-s2 | 8     | 0     | 0     | 0     | 0     | 0     | 0     | 0     |
| C14-s2 | 8     | 0     | 0     | 0     | 0     | 0     | 0     | 0     |
| C15-s2 | 8     | 0     | 0     | 0     | 0     | 0     | 0     | 0     |
| C16-s2 | 6     | 0     | 0     | 0     | 0     | 0     | 0     | 0     |

Illustrated Set Allocation Table for L1 Loaded Cache Memory Cells

Illustrated Block Allocation Connectivity for L1 Loaded Cache Memory Cells

|  | C1-s1b1 | C2-s1b1 | C3-s1b1 | C4-s1b1 | C5-s1b2 | C6-s1b2 | C7-s1b2 | C8-s1b2 |
|---|---|---|---|---|---|---|---|---|
| C9-s2b1 | 12 | 10 | 10 | 6 | 4 | 10 | 10 | 6 |
| C10-s2b1 | 8 | 0 | 0 | 0 | 0 | 0 | 0 | 0 |
| C11-s2b1 | 8 | 0 | 0 | 0 | 0 | 0 | 0 | 0 |
| C12-s2b1 | 8 | 0 | 0 | 0 | 0 | 0 | 0 | 0 |
| C13-s2b2 | 8 | 0 | 0 | 0 | 0 | 0 | 0 | 0 |
| C14-s2b2 | 8 | 0 | 0 | 0 | 0 | 0 | 0 | 0 |
| C15-s2b2 | 8 | 0 | 0 | 0 | 0 | 0 | 0 | 0 |
| C16-s2b2 | 6 | 0 | 0 | 0 | 0 | 0 | 0 | 0 |

Illustrated Block Allocation Connectivity Table for L1 Loaded Cache Memory Cells Illustrated Set Allocation Connectivity Table for L2 Loaded Cache Memory Cells Illustrated Block Allocation Connectivity Table for L2 Loaded Cache Memory Cells Illustrated Set Allocation Connectivity Table for L3 Loaded Cache Memory Cells Illustrated Block Allocation Connectivity Table for L3 Loaded Cache Memory Cells

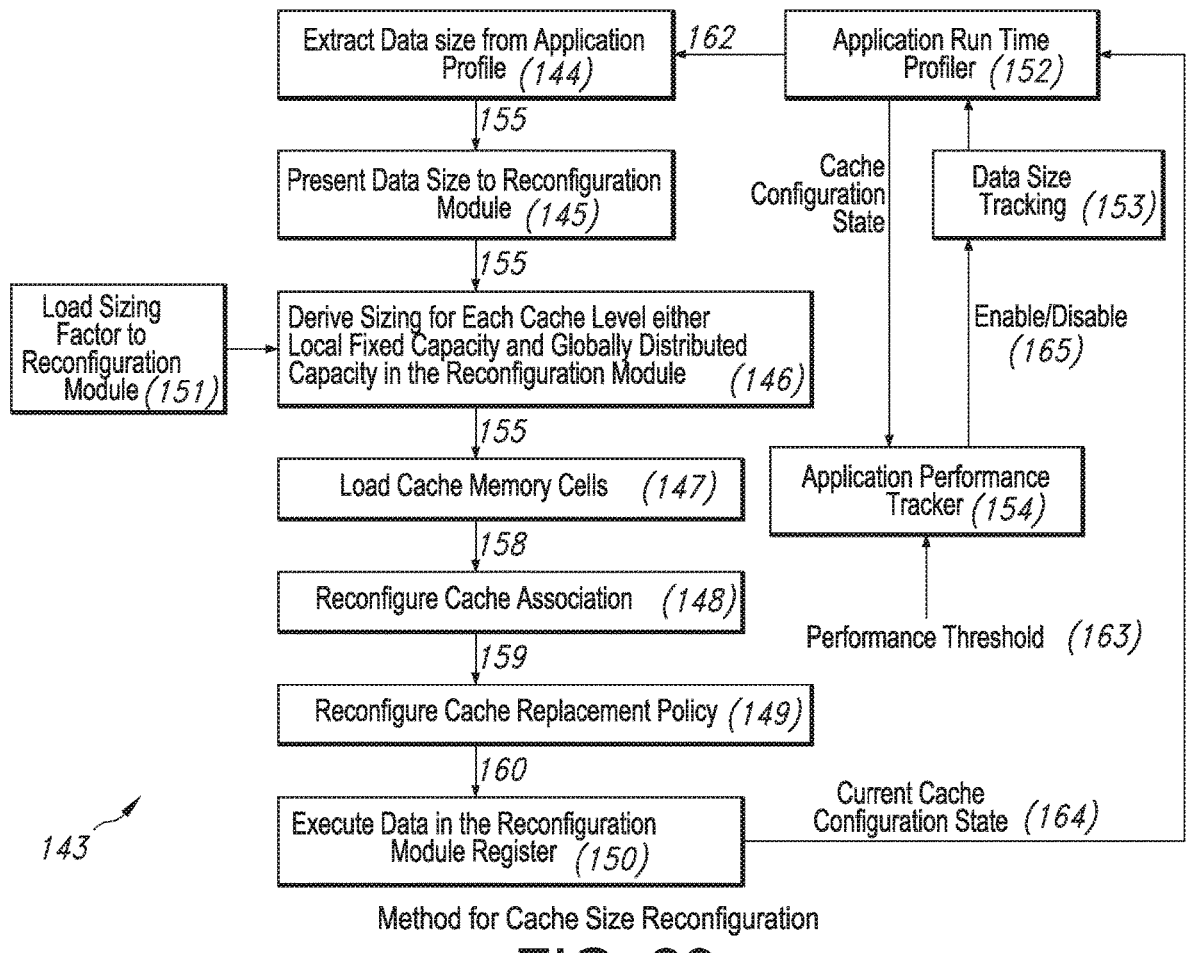
FIG. 29 — Method for Cache Size Reconfiguration
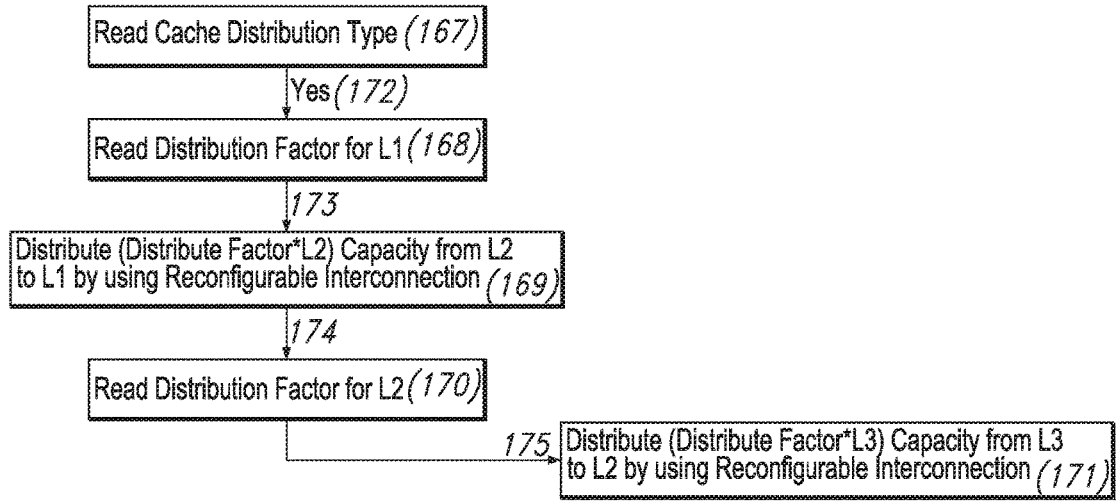
FIG. 30 — Method for Distributed Cache Capacity Distribution Method for Cache Association Reconfiguration

DYNAMIC RECONFIGURABLE MULTI-LEVEL CACHE FOR MULTI-PURPOSE AND HETEROGENEOUS COMPUTING ARCHITECTURES

GOVERNMENT CLAUSE

This invention was made with government support under the U.S. Department of Defense: Army Research Office HBCU/MSI contract W911NF-13-1-0133. Accordingly, the government has certain rights in the invention.

FIELD OF THE INVENTION

The present invention is generally directed towards multi-level cache. More particularly, the present invention relates to dynamic reconfigurable multi-level cache for heterogenous computing architectures.

BACKGROUND OF THE INVENTION

In the last few decades, computing power and speed have seen a technology revolution due to advanced and innovative processing technologies and memory architectures. Processors are increasingly becoming capable of executing larger amounts of instructions using lesser clocking cycles, but the time needed to access data from (main) memory prevents modern day application programs from fully benefiting from this capability. Accessing main memory for execution of each instruction results in slower processing, with the clock speed depending on the time required to find and fetch the data from the main memory. This led to advanced memory models such as, cache memory, with higher access rates in order to realize the potential of fast processors. Whenever the data is required by the processor, it is fetched from the main memory and stored in the smaller memory structure called a cache. If there is any further need of this data, the cache is searched first before accessing the main memory. Furthermore, the cache memory resides closer to the processor in terms of the time taken to search and fetch data in comparison to the main memory thereby resulting in faster access and processing. However, such caching solutions came at a higher cost and hence there is always a trade-off between cost and access speeds. Consequently, memory system solutions are always built with a trade-off between the expensive fastest SRAM memory technologies and higher capacity (lower cost) relatively slower memory technologies, such as DRAM and NAND flash. However, it is difficult to achieve an optimal trade-off for diversity of modern day applications in heterogeneous computing systems. Typically, as application data size increases, there is still a bottleneck of providing the right amount of cache to avoid "capacity" limited cache misses.

Artificial neural networks (ANNs) have wide applications in big data analytics, neuromorphic computing, etc. ANNs comprised of densely interconnected neurons need different configuration of the interconnections of its neurons in runtime. By using Reconfigurable Interconnection Networks implemented on a field-programmable gate array (FPGA), the configuration of the interconnection network can be changed at runtime, enabling different computational operations performed on the same hardware resources. This approach has vast relevance in big data applications using ANN or other high-performance embedded computing architectures. However, the overall throughput can plummet as the application data size increases due to lack of cache size. On the other hand, increasing cache size (hardware) is prohibitive as it impacts the Size, Weight and Power (SWaP) considerations in many commercial and military embedded applications.

In recent research, it was predicted that FPGA can provide sustained processor bandwidth for floating-point sparse matrix Jacobi iterative solver. It was noticed that by running the same application on a General-Purpose Processor (GPP) platform, the processor bandwidth plummets as soon as the application data exceeds certain threshold value (for example, exceeding 2 MB). The reduction of processor bandwidth is largely due to cache misses that are typically of three types: Compulsory, Capacity and Conflict. Of these, the limitation of capacity type where the cache is not big enough to hold every block needed by the processor is the primary reason for processor bandwidth degradation described above. The cache starts spilling even with a good replacement policy.

SUMMARY OF THE INVENTION

The present invention relates to dynamic reconfigurable cache for a heterogeneous computing architecture that can be implemented on, for example, one or more Field Programmable Gate Arrays (FPGAs) to achieve sustained processor bandwidth over varying application data sizes. In one embodiment, a dynamic reconfigurable cache is provided within a system of multi-level cache that includes a processor private cache L1 and a processor shared cache L2 and a bus cache L3 at the interconnect level.

Embodiments of a system for dynamic reconfiguration of cache are disclosed. Accordingly, the system includes a plurality of processors and a plurality of memory modules executed by the plurality of processors. The system also includes a dynamic reconfigurable cache comprising of a multi-level cache implementing a combination of an L1 cache, an L2 cache, and an L3 cache. The disclosed dynamic reconfiguration may extend beyond L3 level to additional cache levels in the multi-level cache to sustain the processor bandwidth for variations in the application data size. The one or more of the L1 cache, the L2 cache, and the L3 cache are dynamically reconfigurable to one or more sizes based at least in part on an application data size associated with an application being executed by the plurality of processors. In an embodiment, the system includes a reconfiguration control and distribution module configured to perform dynamic reconfiguration of the dynamic reconfigurable cache based on the application data size. The relative maximum loadable sizes (N1, N2, N3) of the L1 cache, the L2 cache, and the L3 cache respectively satisfy N3>N2>N1.

In an exemplary embodiment, the dynamic reconfigurable cache is configured to track (variations in) the application data size to dynamically reconfigure a cache association and a replacement policy for the dynamic reconfigurable cache. In addition, the dynamic reconfigurable cache is configured to provide an adaptable cache association to (reconfigurable) cache sizing for L1, L2 and L3 caches respectively. Also, the dynamic reconfigurable cache is configured to provide an adaptable cache replacement policy for L1, L2 and L3 caches respectively. Furthermore, one or more cache memory cells in the dynamic reconfigurable cache are distributed from a higher cache level to a lower cache level by connecting one or more levels of the multi-level cache. For instance, L2 loaded cache capacity is distributed to expand L1 loaded cache by a first distribution factor $$\frac{1}{k1}$$

and L3 loaded cache capacity is distributed to expand L2 loaded cache by a second distribution factor $$\frac{1}{k2}.$$

In an embodiment, me system includes a reconfigurable interconnection configured to connect one or more levels of multi-level cache with one or more other levels of multi-level cache to distribute one or more cache memory cells from a higher cache level to a lower cache level in the dynamic reconfigurable cache.

In the spirit of broader value of this invention, in yet another embodiment of the present invention, any other combinations of sizing, cache association and replacement policies can be used that provides near-optimal constant processor bandwidth for a given application data size.

BRIEF DESCRIPTION OF THE DRAWINGS

Further advantages of the invention will become apparent by reference to the detailed description of preferred embodiments when considered in conjunction with the drawings:

FIG. 29 depicts an embodiment of a method for cache size reconfiguration.

FIG. 30 depicts an embodiment of a method for distributed cache capacity distribution.

DETAILED DESCRIPTION

Figure 1:
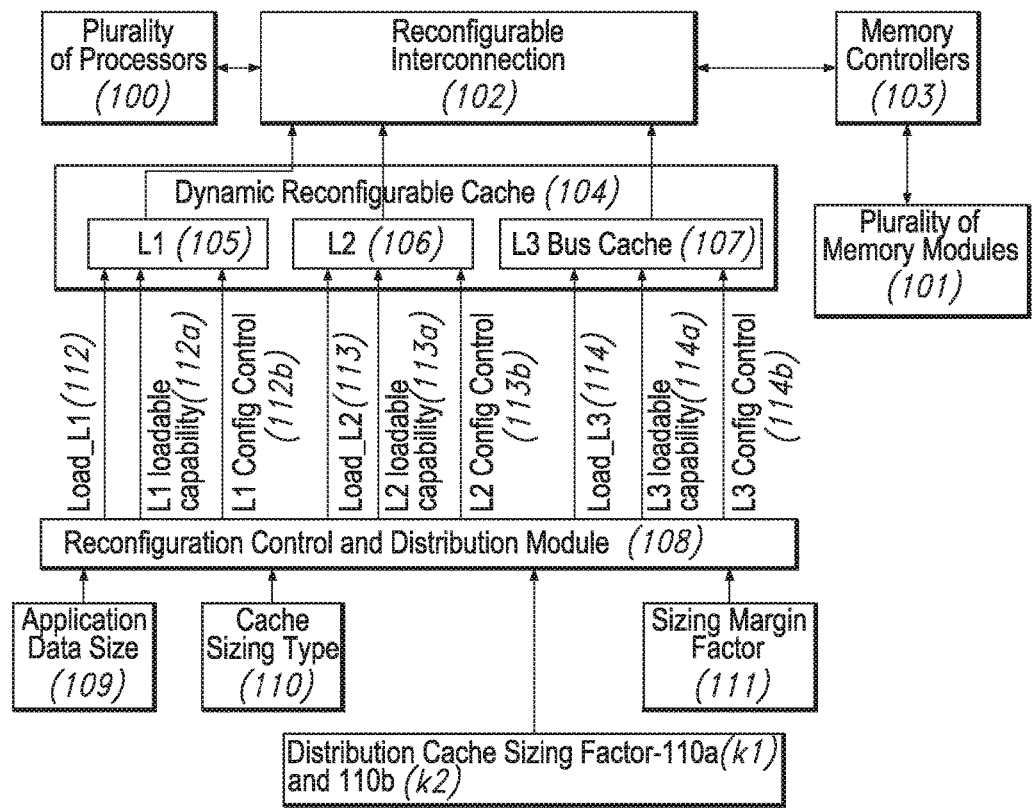
FIG. 1 depicts a multi-level dynamic reconfigurable cache system in accordance with an embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Cache miss rate in a cache memory system depends on how cache data is associated with the main memory. Such association schemes include direct-mapping or n-way set associative mapping. Direct-mapping may be the easiest way to find a block using a 1-1 indexing with the memory. Cache miss rate can be reduced by having flexibility on where to allocate the blocks for replacement. An n-way set associative is made up of a set of n blocks and a tag finds the blocks within that set. Lower cache miss rate can be achieved if the tag and indexing within a set fits well for application data address sequencing. In general, the cache miss rate decreases as cache size increases for an n-way set association with higher value for n. Normally, lower cache miss rate can be achieved for the set associative schemes, but some research on benchmarking on various computing platforms indicates that lower miss rate can be achieved with direct-mapped when certain address sequencing of application is used.

In addition, cache misses are also impacted by block size and cache size. By increasing the block size, the cache miss rate can be reduced. Capacity issue occurs when all blocks are discarded as cache cannot contain all blocks needed to execute the program as the application data size becomes larger than the cache capacity. Therefore, the cache miss rate can be reduced by increasing total cache size. Yet another reason for capacity issue is conflict occurrence when an n-way set association or direct mapping is used. The miss rate in such a case can be reduced using larger n. However, at larger cache sizes, the variations in miss rates are insignificant for any variations in n. The cache miss rate is higher for low cache size and lower for n-way association with higher n. However, as the cache size increases, the miss rate reduces and almost stays constant irrespective of cache association used. Therefore, it is desirable to optimally reconfigure the cache size as proposed in the present invention. Furthermore, miss rates of each level of cache in multi-level cache impacts the memory stall cycles per access.

In addition to increase sizing, cache association and replacement policies can further reduce the memory stalls cycles thus increasing the processor bandwidth. In general, at a higher cache association (n>8 for n-way set associative mapping), many researchers have observed diminishing results for integer applications for small caches and consider a smaller n to increase block size. However, some benchmark results also indicate that for floating-point applications, higher association is beneficial for small caches and the return diminishes for larger caches. Therefore, an optimized solution as proposed in the disclosed methods and systems is based on offering reconfigurability from a general application type perspective.

In general, processor performance is given by its execution time T(p)=T [C+M] where C is the processor execution cycles and M is the memory stall cycles and T is the clock period. For an illustrative 3-level cache memory, the memory stall cycles per data access can be stated as: (1−h1)h2 T2+(1−h1)(1−h2)h3 T3+(1−h1)(1−h2)(1−h3) m, where m is the memory access penalty and h1 is the hit rate of L1 and (1−h1), (1−h2), and (1−h3) are the cache miss rates of level L1, level L2 and level L3, respectively. As stated before, cache miss rates reduce as the cache size increases. As a result, the cache miss rate is approximately inversely proportional to cache size. For good relative sizing of cache at each level, the application can cache within the 3 levels (in the above example) without incurring long memory penalty to access the main memory. Processor bandwidth is approximately equal to a.

$$\frac{D}{T(p)}$$

where D is application data and "a" is the constant of proportionality. In order to achieve a sustained processor bandwidth for a given application data size, it is highly desirable to reduce execution time T(p).

As described earlier, memory technology plays a major role in achieving sustained processor bandwidth. Processor execution time T(p) is impacted by the average memory access time t(M) which can be reduced by using faster memory technologies in the memory hierarchy. In general, the bandwidth can be sustained over different application data sizes by optimizing the average memory access time and cumulative cache sizing S. The average memory access time and the cumulative cache sizing can be optimized by using distribution of memory technologies to build cache levels. Therefore, the disclosed approach explores the generalized use of distribution of future memory technologies within one embodiment of the present invention (explained later with reference to FIG. 5).

To further achieve best results, for a given cache sizing, the disclosed reconfiguration can provide the best data association of cache with memory, cache block size, and cache replacement policies. Least Recently Used (LRU) cache replacement policy provides lower cache miss rate than using a Random replacement policy. For example, most benchmark data show that LRU offers an average 3-15 reductions in cache misses per 1k instruction execution and the reduction is larger for smaller cache sizes. An increase in association from higher n for n-way association reduces the misses for up to 5. In general, LRU has better performance than First In First Out (FIFO) and Random policy across all cache sizes. As the cache size increases, there is no winner between FIFO and Random. In this case, FIFO simplicity plays a major role. For smaller cache sizes, FIFO dominates. However, it is unclear as to what can be the best cache replacement policies that can be applied to a diverse High Performance Embedded Computing (HPEC) or High Performance Computing (HPC) applications. Therefore, any reconfiguration of the replacement policies, as disclosed in the present invention, to adapt to workload (heavy duty application having large application data size), cache size, and association can provide near-optimal solutions.

In current systems, cache sizes at levels 1, 2 and 3 are typically at 64 K, 2 MB and 32 MB, but can vary across many commercial platforms. In the spirit of the present invention, a generality has been intended to utilize the disclosed approach for any future memory technology growth by providing increased cache capacity. In an exemplary embodiment of the invention, a multi-level cache that can be dynamically reconfigured is disclosed. Accordingly, the multi-level cache uses 3-level cache and generalizes the maximum loadable cache memory capacities for L1, L2 and L3 as N1, N2 and N3, respectively. Further, the reconfigurable loaded cache sizes are designated as S1, S2, and S3 using the cache memory cell granularities of n1, n2, and n3, respectively.

In an embodiment, for a given an application data size D, the following exemplary set of equations provide a generality of cache sizing at each cache level:

$S1=[D/n1]*n1, S2=2*n2, S3=2*n3$ for $0 \leq D \leq N1$ $S1=2*n1, S2=[D/n2]*n2, S3=2*n3$ for $N1<D \leq N2$ $S1=2*n1, S2=2*n2, S3=[D/n3]*n3$ for $N2<D \leq N3$ $S1=2*n1, S2=N2, S3=N3$ for $D>N3$ Using example values of n1=16 kB, N1=512 kB, n2=256 kB, N2=8 MB, n3=1 MB, and N3=32 MB, the cache sizing based on the above set of equations is as follows:

$S1=[D/16k]*16k, S2=2*256k, S3=2*1$ MB for $0 \leq D \leq 512k$ $S1=2*16k, S2=[D/256k]*256k, S3=2*1$ MB for $512k<D \leq 8$ MB $S1=2*16k, S2=2*256k, S3=[D/1 \text{ MB}]*1$ MB for $8$ MB$<D \leq 32$ MB $S1=2*16k, S2=8$ MB$, S3=32$ MB for $D>32$ MB Beyond the cache size, the communication network also plays a major role in determining the processor and memory performances. The communication time can be analytically predicted for different data sizes and the number of processors involved, provided that the communication network topology allows matching of the communication model to different applications. This is seldom true in heterogeneous computing platforms due to diversity of HPEC and HPC applications. Therefore, the communication network parameters are also major factors in determining optimal dynamic (re)configuration of the cache memory.

The present invention provides a dynamic reconfigurable cache at levels L1 (processor private), L2 (processor shared) and L3 (bus interconnect) by dynamically loading cache memory sizes for each of these levels and uses the best association and replacement policy for the given sizing. The sizes for cache at three levels can be reconfigured to mitigate any possible cache capacity limitation so that memory stall cycles are reduced. Using a dynamically loaded cache memory cell, the cache sizing can be reconfigured in runtime to continuously track a given application data size D associated with an application being executed. The cache size is reconfigured up to maximum loadable sizes of N1, N2 and N3 for caches L1, L2 and L3, respectively. In an embodiment, the cache sizes are reconfigured after distributing the loaded local cache sizes S1, S2 and S3 to achieve a distributed sizing S1_D, S2_D and S3_D using distributing factors of $$\frac{1}{k1}$$

and $$\frac{1}{k2}$$

for the distribution from S2 and S1 and from S3 to S2, respectively. A reconfigurable distribution network provides the connectivity for such a distribution within a reconfigurable interconnection. Main reconfigurable interconnect as disclosed in an earlier patent application titled "Reconfigurable Architecture on One or More Integrated Circuits" is incorporated herein by reference in its entirety.

It is to be appreciated by those skilled in the art that the distribution of cache sizing according to the disclosed methods and systems is generalized to account for any new memory technology growth in future that provides a better optimization of memory speed and sizing (cost) to achieve sustained processor bandwidth. The present invention also provides for best possible cache association for a given loaded cache size for exemplary cache levels L1, L2 and L3, respectively. The present invention also provides the best possible cache replacement policy for a given loaded cache size for cache levels L1, L2 and L3, respectively.

In an embodiment, the cache sizing is given a sizing margin beyond the reconfiguration sizing threshold to ensure a safe margin to cache the data before incurring large memory stall cycles. The present invention also provides a general adaptive cache association vector generated for a given cache size range and mechanism to select the association parameters and routing table for connection of cache memory cell signals to organize into the desired association. The present invention also provides a comprehensive method and necessary steps to achieve the dynamic reconfiguration of the multi-level caches. Also provided are methods for distribution of cache sizing and for cache association reconfiguration. The disclosed systems and methods also provide a cache association to a given cache level (e.g. L1 cache) adapted to corresponding reconfigurable cache sizing for that level. The disclosed systems and methods further provide a cache association to a given cache level (e.g. L2 cache) adapted to corresponding reconfigurable cache sizing (e.g. S2) derived based at least in part on the application data size.

FIG. 1 depicts a multi-level dynamic reconfigurable cache system in accordance with an embodiment. Referring to FIG. 1, the overall multi-level distributed dynamic reconfigurable cache system includes a plurality of processors 100, a plurality of memory modules 101, interconnected using an interconnection network or reconfigurable interconnection 102, and a dynamic reconfigurable cache 104. The dynamic reconfigurable cache 104 includes an L1 processor private cache 105, an L2 processor shared cache 106, and an L3 interconnect bus cache 107 that can be controlled by a reconfiguration control and distribution module 108 by loading the required cache memory modules. The reconfigurable interconnection 102 in the interconnection network is driven by memory controllers 103. The L3 interconnect bus cache 107 can be part of a bus cache system at the interconnect level architected and disclosed in another previous patent application titled "Bus Cache on a Reconfigurable Interconnect" the contents of which is incorporated herein by reference in its entirety.

The input to the reconfigurable cache includes an application data size 109, a cache sizing type 110, a distributed cache sizing factor (k1) from L2 to L1 110a, a distributed cache sizing factor (k2) from L3 to L2 110b and a sizing margin factor 111. The reconfiguration control and distribution module 108 is configured to provide to the L1 processor private cache 105 with a Load_L1 112, an L1 loadable capability 112a, and L1 config control 112b. Similarly, the reconfiguration control and distribution module 108 is configured to provide to the L2 processor shared cache 106 with a Load_L2 113, an L2 loadable capability 113a, and L2 config control 113b. Also, the reconfiguration control and distribution module 108 is further configured to provide to the L3 interconnect bus cache 107 with a Load_L3 114, an L3 loadable capability 114a, and L3 config control 114b.

Embodiments of a system for dynamic reconfiguration of cache are disclosed. The system includes the dynamic reconfigurable multi-level cache (e.g. 104) and a reconfiguration control and distribution module 108 configured to dynamically reconfigure sizing of the dynamic reconfigurable multi-level cache (e.g. 104) based at least in part on an application data size D associated with an application being executed. The system further includes a reconfigurable interconnection 102 configured to create a distributed multi-level cache by organizing a plurality of cache memory cells from a higher level cache (e.g. L2) into a lower level cache (e.g. L1) for expansion of the lower level cache in the dynamic reconfigurable multi-level cache (e.g. 104).

It is to be noted by those skilled in the art that the disclosed reconfigurable interconnection 102 enables distribution of cache sizing from higher cache level to lower cache level with memory cells built from any new memory technologies at each cache level. Such distribution of cache sizing permits expansion of the cache size by connecting the cache memory cells using the reconfigurable interconnection. Also, a distribution factor obtained or read for loaded lower level cache (e.g. L1) can be used for distributing from loaded higher level cache (e.g. L2) to loaded lower level cache (L1). Alternatively, a distribution factor obtained or read for loaded higher level cache (e.g. L2) can be used for distributing from loaded higher level cache (e.g. L2) to loaded lower level cache (L1).

Figure 2:
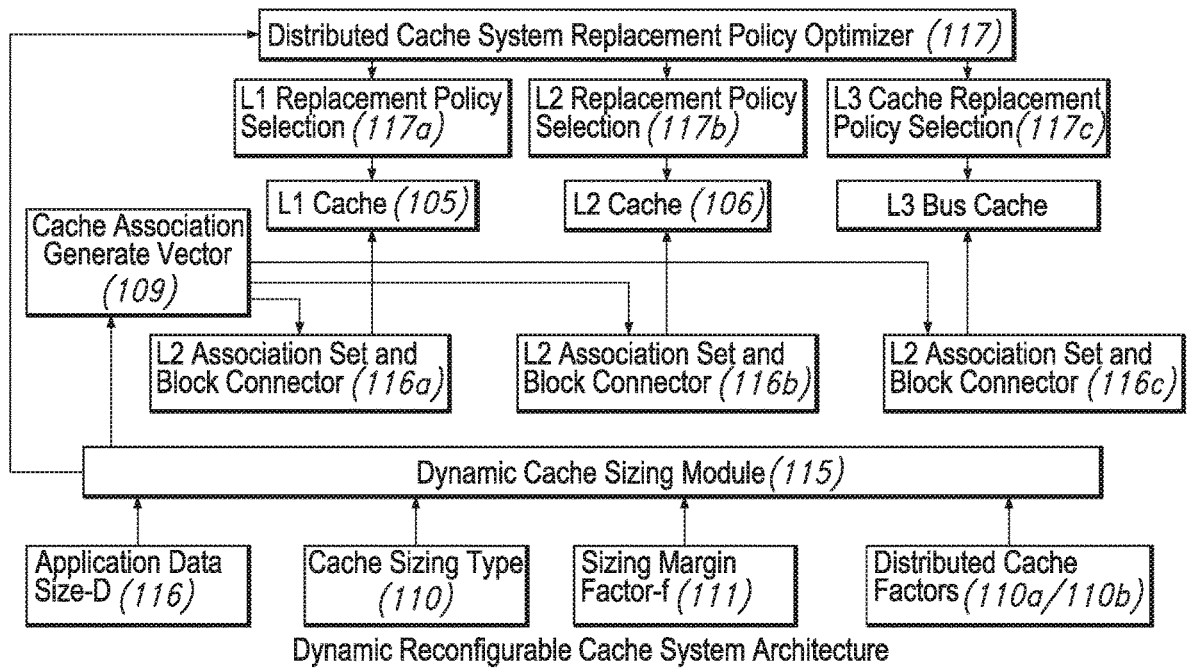
FIG. 2 depicts an architecture of dynamic reconfigurable cache system in accordance with an exemplary embodiment.

FIG. 2 depicts an architecture of dynamic reconfigurable cache system in accordance with an exemplary embodiment. The overall system architecture includes a dynamic cache sizing module 115 and a distributed cache system replacement policy optimizer 117. In an embodiment, a replacement policy is selected for cache levels L1, L2, L3 using the corresponding replacement policy selections 117a, 117b and 117c, respectively. The system architecture also includes a cache association generate vector 116 generates the association vector for each level that drives the association set and block connectors for levels L1 116a, L2 116b and L3 116c respectively. In operation, the dynamic cache sizing module 115 receives input that includes the application data size (D) 109, the cache sizing type 110, the distributed cache (sizing) factors (110a, 110b) and sizing margin factor 111. The dynamic cache sizing module 115 drives the cache association generate vector 116 and the distributed cache system replacement policy optimizer 117.

Figure 3:
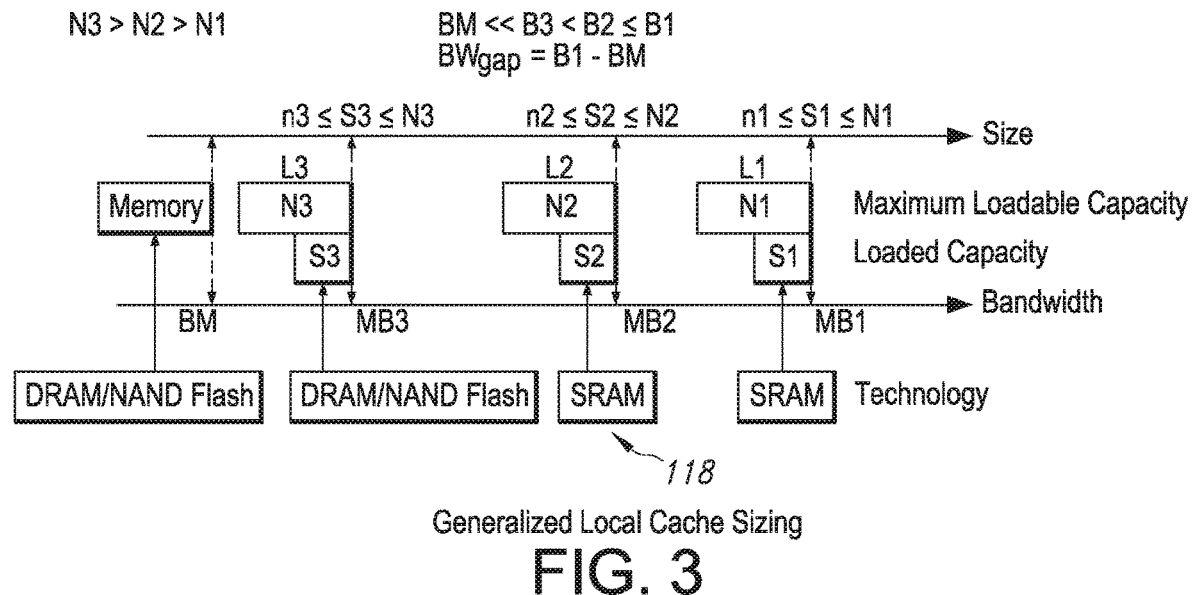
FIG. 3 depicts a generalized local cache sizing in accordance with an embodiment.

FIG. 3 depicts generalized local cache sizing 118 in accordance with an embodiment. The generalize local cache sizing 118 has maximum loadable capacity of N1, N2 and N3 for levels L1, L2 and L3, respectively in which S1, S2 and S3 are reconfigurable sizes. In an embodiment, S1, S2, S3 correspond to 64 K, 2 MB and 32 MB respectively. The memory technology shown for each level is within the context of technologies (e.g. SRAM, DRAM) widely used today at these levels and in no way limits the scope of the present invention as future memory technologies can still support the generality of the disclosed cache sizing. Various relationships between memory capacities N1, N2 and N3, the reconfigurable loaded cache sizes S1, S2, and S3, and the cache memory cell granularities of n1, n2, and n3 are depicted in FIG. 3. For instance, N3>N2>N1, n3≤S3≤N3 for L3, n2≤S2≤N2 for L2, and n1≤S1≤N1 for L1. The figure also shows the increasing order of sizes and bandwidth across memory and cache levels L3, L2, and L1. BM is the memory bandwidth of main memory. MB3, MB2, and MB1 are memory bandwidths at levels 3, 2 and 1, respectively.

Figure 4:
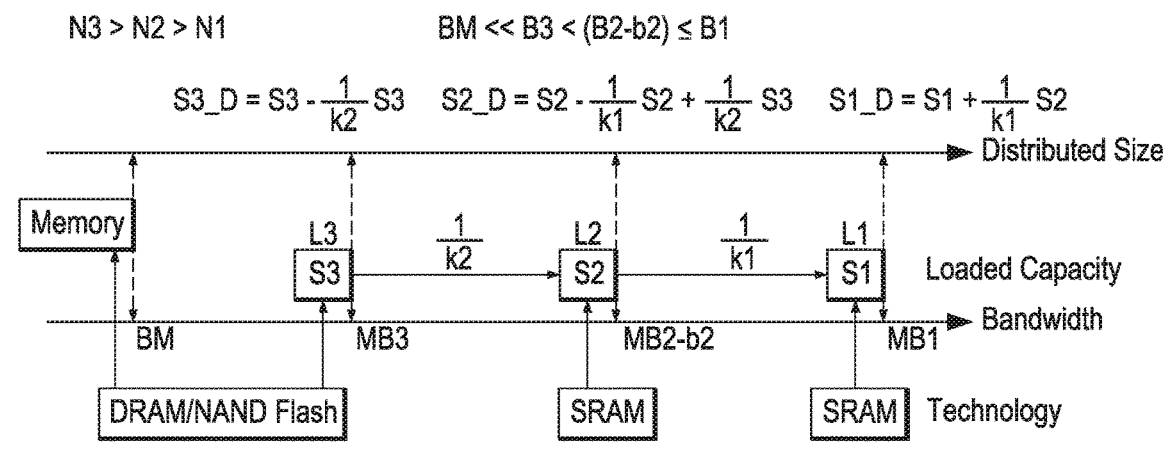
FIG. 4 depicts a generalized cache sizing distribution in accordance with an embodiment.

FIG. 4 depicts generalized cache sizing distribution 119 in accordance with an embodiment. As shown, the generalize cache sizing distribution 119 distributes sizes S3 to S2 and S2 to S1 respectively with distribution sizing factors $$\frac{1}{k1}$$

and $$\frac{1}{k2}$$

respectively. The memory technology shown for each level is within the context of technologies widely used today at these levels and in no way limits the scope of the present invention as future memory technologies can still support the generality of the sizing distribution. The distributed sizes for L3, L2, and L1 are also depicted in the figure. In an embodiment, for L2, a bandwidth degradation b2 is attributed to slower memory technology blocks distributed from L3 thereby leading to a bandwidth of (MB2-b2). The figure also shows the increasing order of distributed sizes and bandwidth across memory and cache levels L3, L2, and L1.

Figure 5:
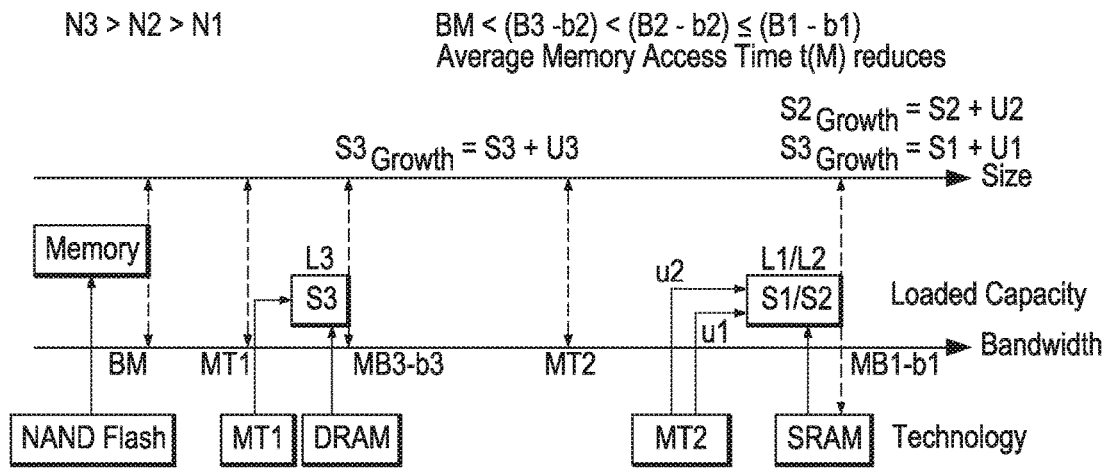
FIG. 5 illustrates an embodiment of cache sizing for future memory technology growth.

FIG. 5 illustrates an embodiment of cache sizing 120 for future memory technology growth. As shown, the generalized cache sizing 120 is proposed to include future memory technology (MT) growth at levels 3 and 2 designated as MT1 and MT2. These memory technologies fall somewhere between the next higher level in the hierarchy and the next lower level in the hierarchy. The levels L3 and L2 can now have cache blocks with mixture of future technologies and current memory technologies to provide optimum memory bandwidth with higher cache sizing to ensure an increased average memory bandwidth across the hierarchy with optimum sizing. Any reduction in bandwidth b3 and b1 is attributed to the use of slower memory technologies MT1 and MT2 in the hierarchy. BM is the memory bandwidth of main memory. MB3, MB2, and MB1 are memory bandwidths at levels 3, 2 and 1, respectively.

Figure 6:
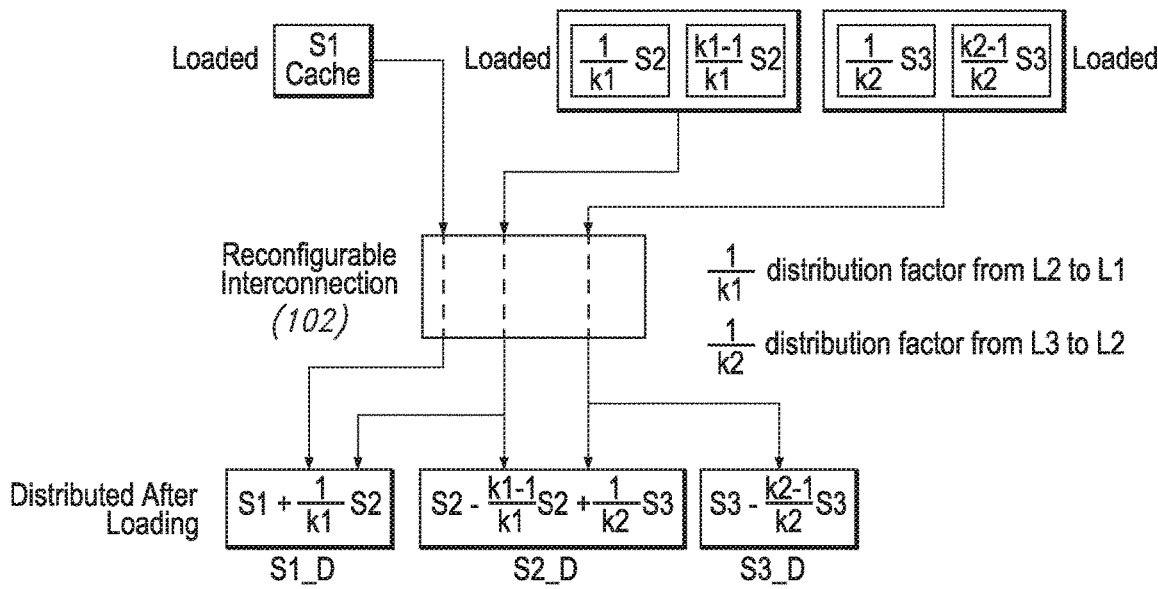
FIG. 6 depicts an embodiment of a reconfigurable interconnection for distributed cache sizing.

FIG. 6 depicts an embodiment of reconfigurable interconnection 102 for distributed cache sizing. Accordingly, the reconfigurable interconnection 102 creates a distributed cache in which some cache cells from L2 are organized into L1 for expansion of L1 and some cache cells from L3 are organized into L2 for expansion of L2. In an embodiment, two distribution factors of $$\frac{1}{k1}$$

and $$\frac{1}{k2}$$

are used. Consequently, L1 is expanded with $$\frac{1}{k1}$$

S2 and L2 is expanded with $$\frac{1}{k2}$$

S3 as shown in the figure.

Figure 7:
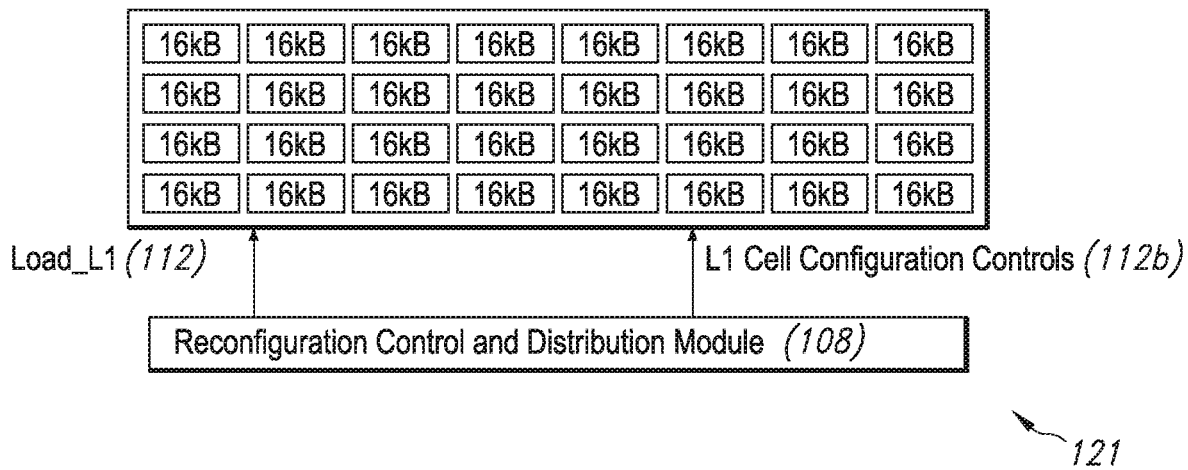
FIG. 7 illustrates an embodiment of reconfiguration and distribution of L1 cache memory cells.

FIG. 7 illustrates an embodiment of reconfiguration and distribution 121 of L1 cache memory cells. Referring to the figure, L1 cache memory has a maximum loadable capacity of 512 kB (N1) that can be partitioned using a cache memory cell granularity of 16 kB (n1). In the example illustrated, S1=n1 to N1. L1 cache cells can be individually loaded via the L1 cell configuration controls 112b after Load_L1 112 is activated by the reconfiguration control and distribution module 108 (with reference to FIG. 1).

Figure 8:
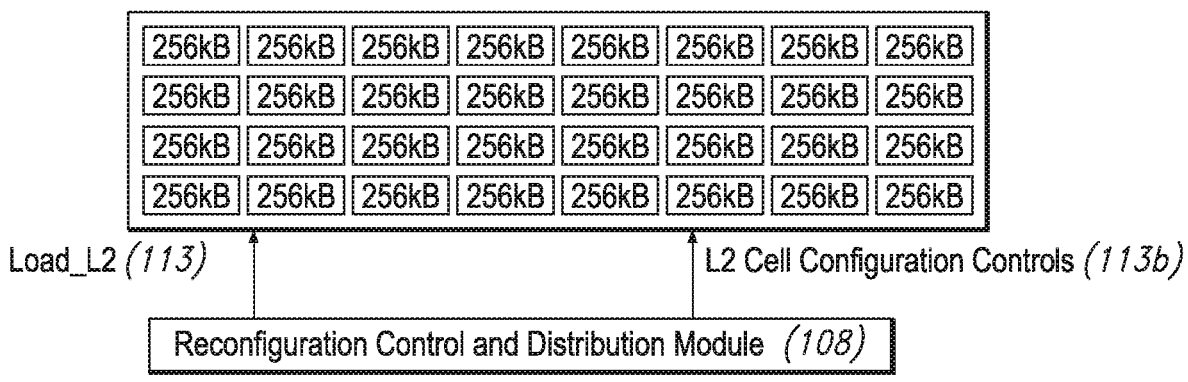
FIG. 8 illustrates an embodiment of reconfiguration and distribution of L2 cache memory cells.

FIG. 8 illustrates an embodiment of reconfiguration and distribution 122 of L2 cache memory cells. Referring to the figure, L2 cache memory has a maximum loadable capacity of 8 MB (N2) that can be partitioned using a cache memory cell granularity of 512 kB (n2). In the example illustrated, S2=n2 to N2. L2 cache cells can be individually loaded via the L2 cell configuration controls 113b after Load_L2 113 is activated by the reconfiguration control and distribution module 108.

Figures 9, 10:
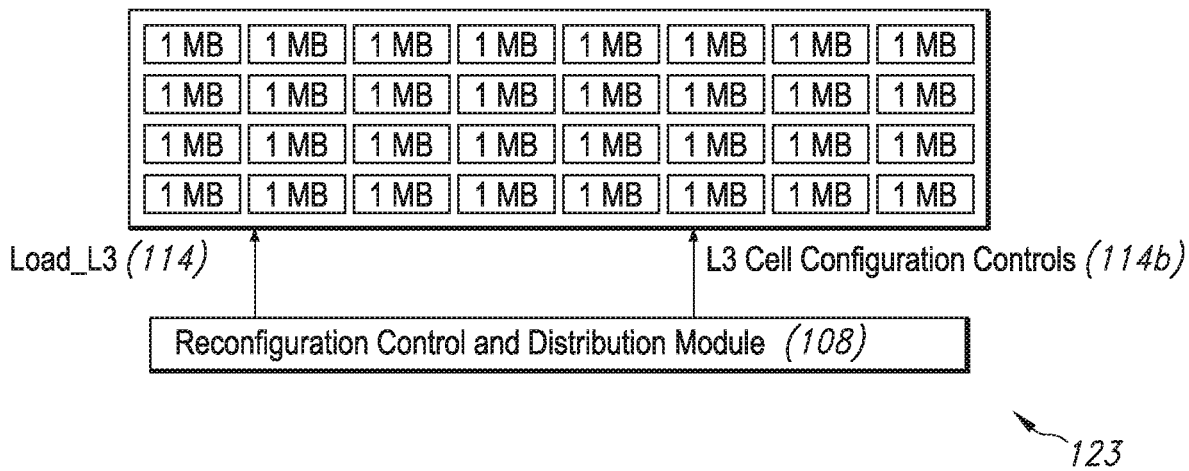
FIG. 9 illustrates an embodiment of reconfiguration and distribution of L3 cache memory cells.
FIG. 10 depicts generalized local cache sizing equations in accordance with an exemplary embodiment.

FIG. 9 illustrates an embodiment of reconfiguration and distribution 123 of L3 cache memory cells. Referring to the figure, L3 cache memory has a maximum loadable capacity of 32 MB (N3) that can be partitioned using a cache memory cell granularity of 1 MB (n3). In the example illustrated, S3=n3 to N3. L3 cache memory cells can be individually loaded via the L3 cell configuration controls 114*b* after load Load_L3 114 is activated by the reconfiguration control and distribution module 108.

FIG. 10 depicts generalized local cache sizing equations in accordance with an exemplary embodiment. As shown, the generalization of local sizing can be expressed in the form of a set of sizing equations that includes four data ranges labeled as 124, 125, 125*a*, and 126. The data range 124 corresponds to the equation: S1=[D/n1]*n1, S2=2*n2, S3=2*n3, for 0≤D≤N1. Similarly, the data range 125 corresponds to the equation: S1=2*n1, S2=[D/n2]*n2, S3=2*n3 for N1<D≤N2. Similarly, the data range 125*a* corresponds to equation: S1=2*n1, S2=2*n2, S3=[D/n3]*n3 for N2<D≤N3. Lastly, the data range 126 corresponds to the equation: S1=2*n1, S2=N2, S3=N3 for D>N3.

Although according to the exemplary embodiment, the multi-level cache uses 3-levels, it is to be appreciated by those skilled in the art that the disclosed approach and the set of generalized equations can be extended to any number of levels of cache memory without departing from the scope of the ongoing description. In the sizing equations, the maximum loadable cache memory capacities for L1, L2 and L3 levels are depicted as N1, N2 and N3, respectively. Further, the reconfigurable loaded cache sizes are designated as S 1, S2, and S3 using the cache memory cell granularities of n1, n2, and n3, respectively.

Figures 11, 12:
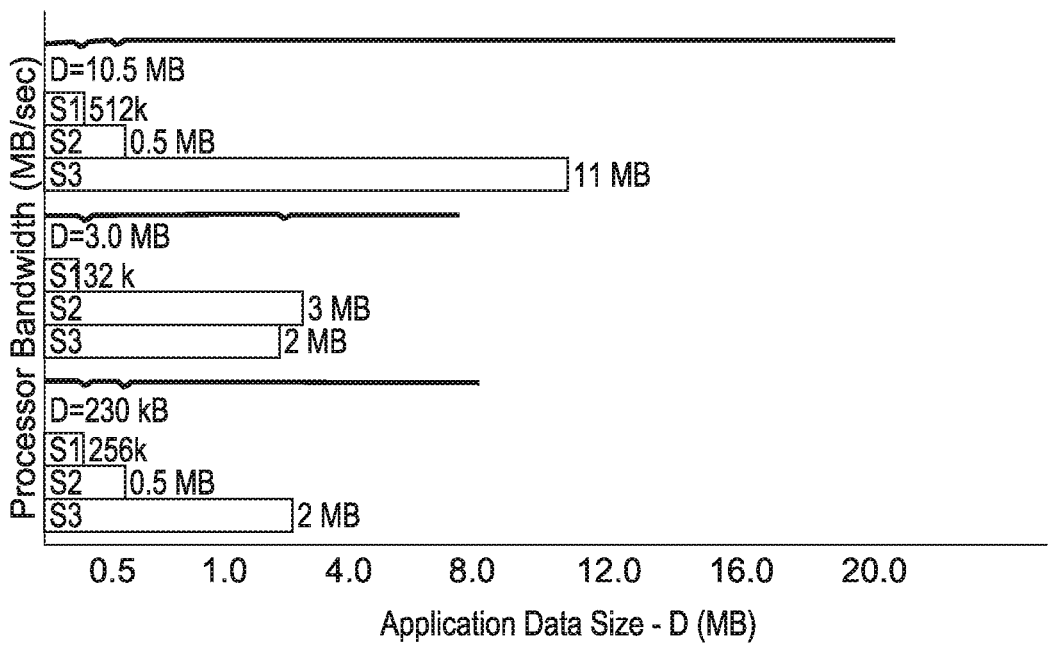
FIG. 11 depicts generalized distributed cache sizing equations in accordance with an embodiment.
FIG. 12 illustrates an embodiment of reconfigurable local cache sizing for processor bandwidth using cache sizing equations depicted in FIG. 10.

FIG. 11 depicts generalized distributed cache sizing equations in accordance with an embodiment. The generalized distributed cache sizing equations includes details of distribution as shown in FIG. 4. S1_D, S2_D and S3_D are the distributed cache sizes using $$\frac{1}{k1}$$

and $$\frac{1}{k2}$$

as the distribution sizing factors as explained earlier. In general, it can be recognized from the equations in FIG. 11 that S1+S2+S3=S1_D+S2_D+S3_D.

FIG. 12 illustrates an embodiment of reconfigurable local cache sizing for processor bandwidth using sizing equations depicted in FIG. 10. Referring to FIG. 12, the illustration of disclosed dynamic reconfigurable cache scheme is shown for application data sizes D=230 kB, 3 MB and 10 MB in which the relative cache sizes are reconfigured. The figure shows dynamic reconfiguration of sizes S1, S2, S3 for different values of application data sizes D for processor bandwidth. In an embodiment, due to reconfiguration switching time at the boundaries of accessing the next cache level, a small drop in processor bandwidth may be seen, but the disclosed scheme tracks the application data size D to provide sustained bandwidth again.

Figure 13:
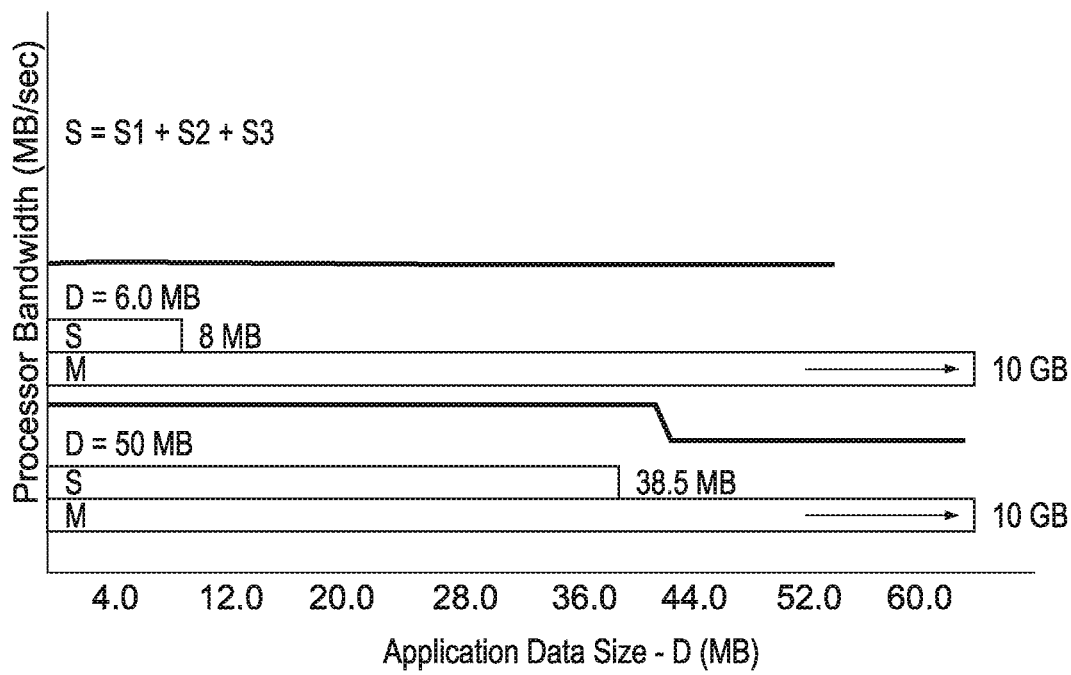
FIG. 13 illustrates a cumulative cache sizing for processor bandwidth in accordance with an embodiment.

FIG. 13 illustrates cumulative cache sizing for processor bandwidth in accordance with an embodiment. Referring to the figure, an illustration of dynamic reconfigurable cache scheme is shown for with cumulative cache sizing for an example of D=6 MB and D=50 MB. Due to reconfiguration switching time at the boundaries of accessing the next cache level, a small drop in processor bandwidth may be seen, but the scheme tracks the data size D to provide sustained bandwidth again. In the figure, cumulative cache size S=S1+ S2+S3 and M denotes (main) memory.

Figure 14:
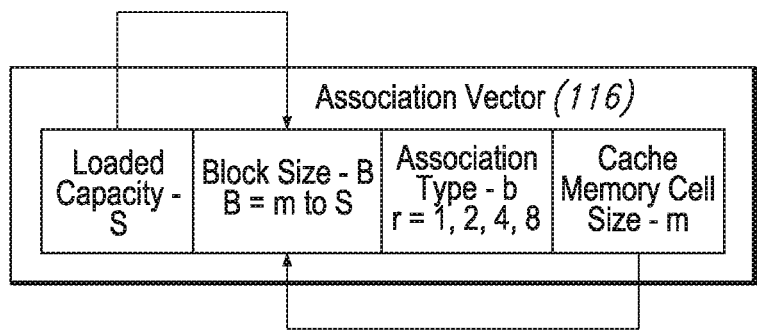
FIG. 14: illustrates an embodiment of a generalized cache association vector.

FIG. 14 illustrates an embodiment of a generalized cache association vector 116. As shown, the generalized cache association vector 116 includes a load cache capacity (S), a block size (B), an association type, and a cache memory cell size (m). For a given association type (blocks per set denoted by r), the number of sets are selected as shown in FIG. 14. The number of sets q=(S/r)*B such that SB≥1 and the total number of cells=S/m.

Figure 15:
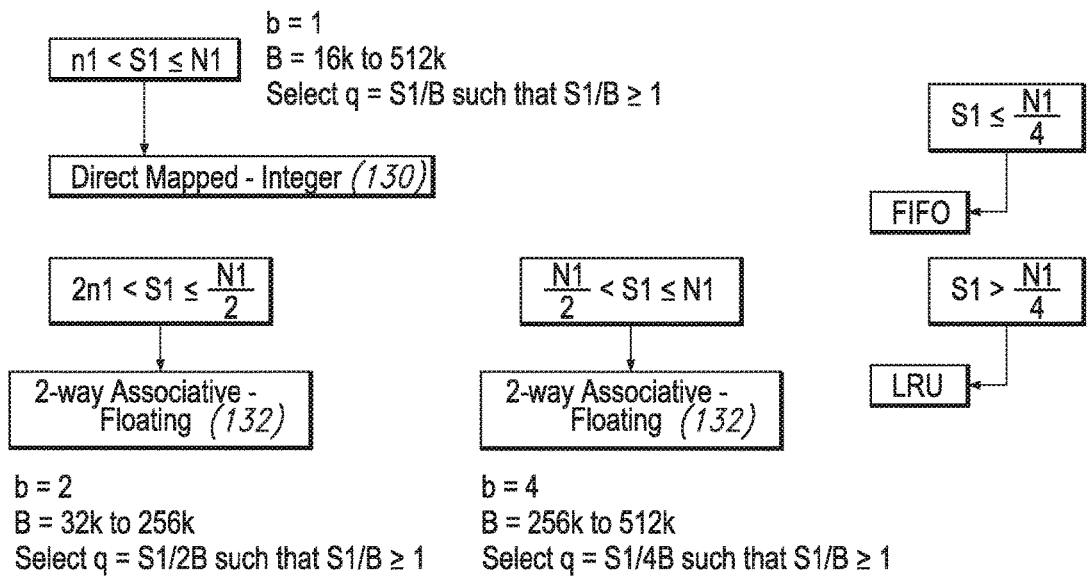
FIG. 15 illustrates an embodiment of L1 cache association and replacement policy.
Figure 16:
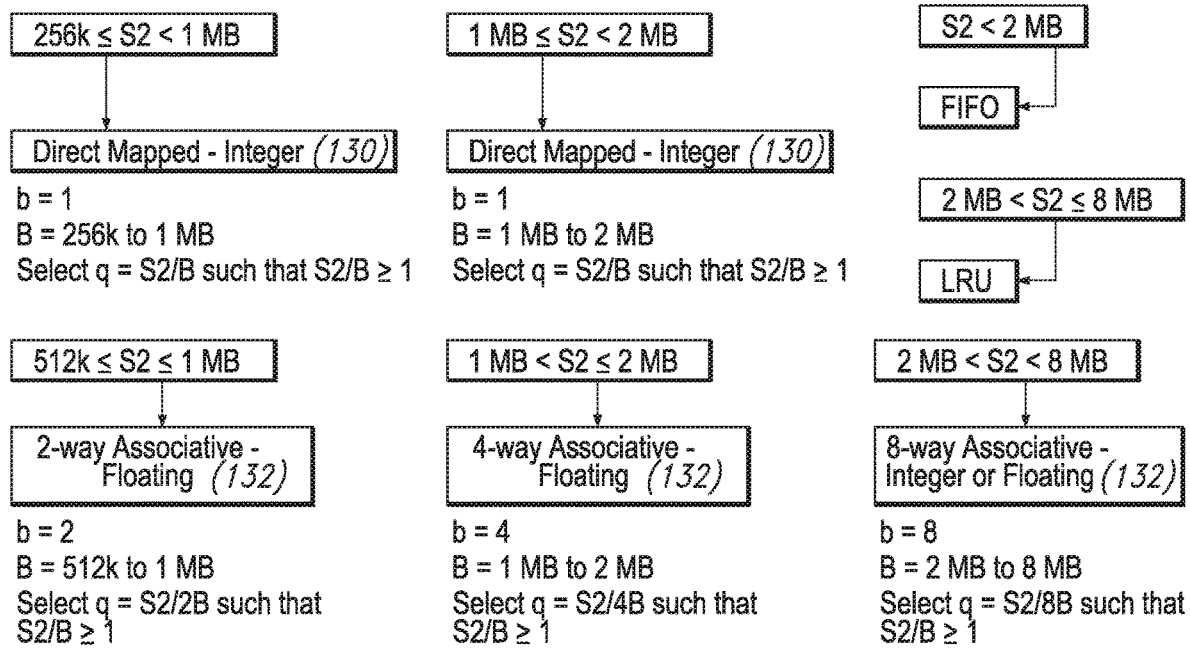
FIG. 16: illustrates an embodiment of L2 cache association and replacement policy.
Figure 17:
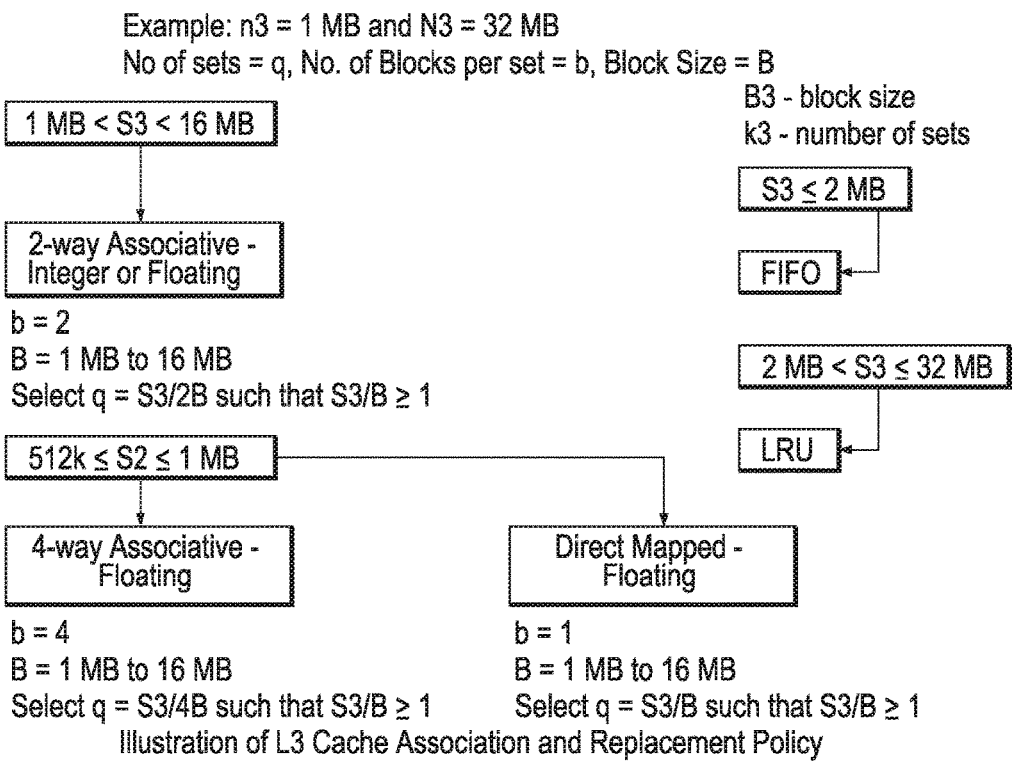
FIG. 17 illustrates an embodiment of L3 cache association and replacement policy.

FIGS. 15 through 17 illustrate the cache association and cache replacement policy adaptation for attaining best near-optimal performance for a given cache size for L1, L2, and L3 respectively. FIG. 15 is the cache association and replacement policy adaptation using reconfiguration for L1 cache. In the example shown, n1=16 kB, N1=512 KB. As shown, for various values of S1 and desired values (of q, r, and B), L1 cache association and replacement policy results in a direct-mapped integer 130, a 2-way associative floating 132, a FIFO, or LRU for L1 cache. Similarly, FIGS. 16 and 17 show the cache association and replacement policy for L2 and L3 caches, respectively. The type of applications (integer or floating-point) determines different near-optimal cache associations and replacement policies.

Figure 18:
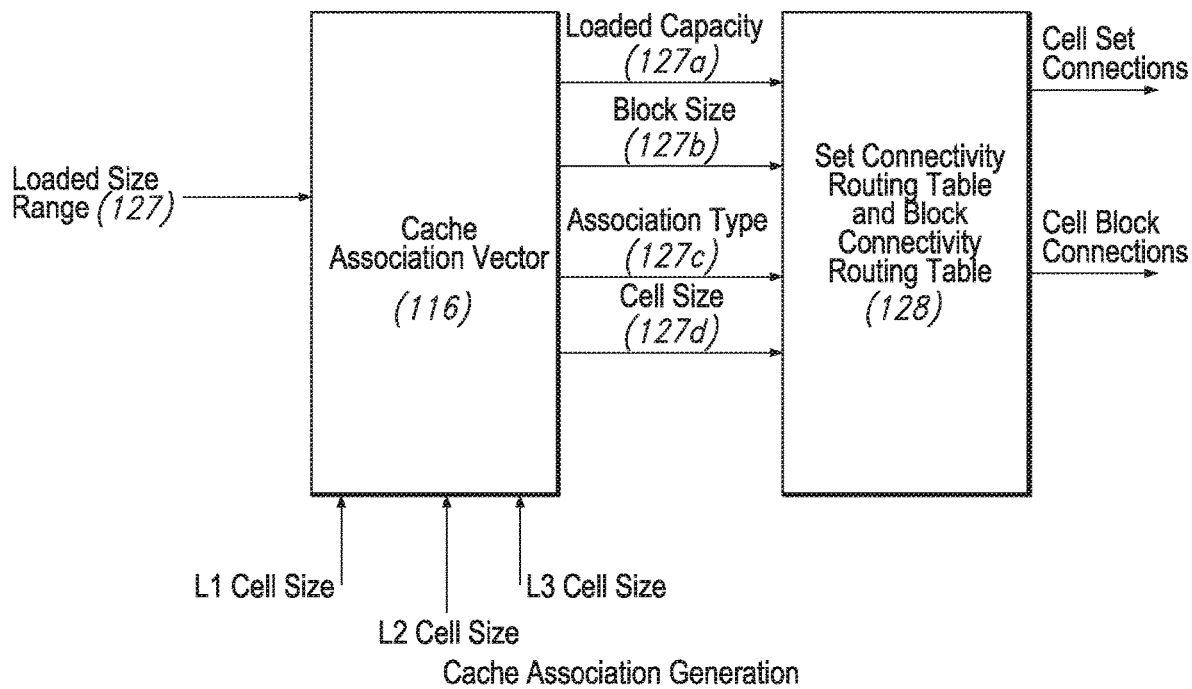
FIG. 18 illustrates an embodiment of cache association generation.

FIG. 18 shows an embodiment of the cache association generation. The cache association generation includes the cache association vector 116 that, based on the loaded size range 127 provides four parameters: a loaded capacity 127*a*, a block size 127*b*, an association type 127*c* and cache cell size 127*d*. The set connectivity and block connectivity routing tables 128 provide cell set (allocation) connections and cell block (allocation) connections for cache cells for each of the cache levels (e.g. L1, L2, L3) based on the four parameters.

Figure 19:
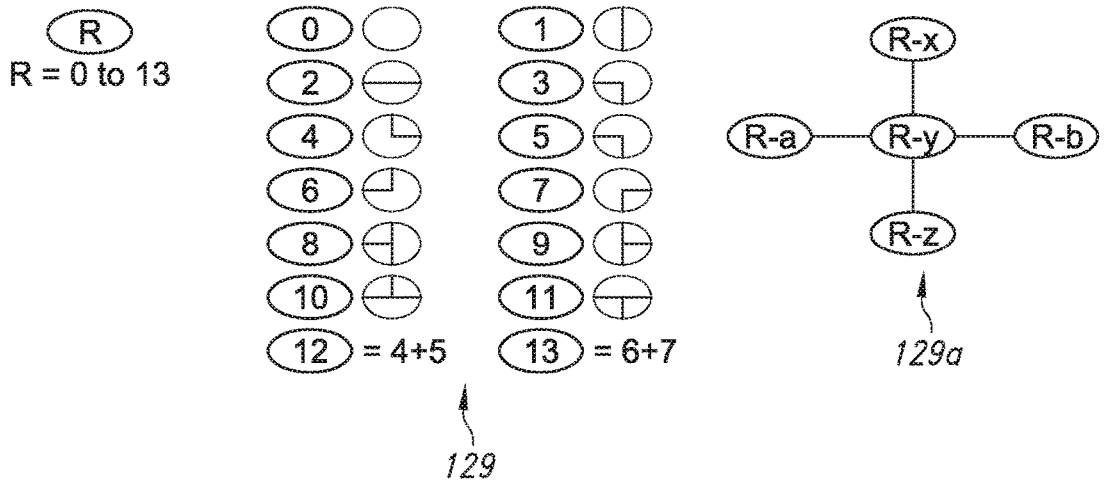
FIG. 19 illustrates an embodiment of cache cells set and block connectivity symbols for cache association.

FIG. 19 illustrates an embodiment of cache cells set and block connectivity symbols for cache association. As shown, set and block connectivity symbols 129 are used by the disclosed systems and methods for connection of cache memory cells to achieve the desired cache association. The connectivity to each cell is determined by the connectivity within the symbol and four neighbors as shown in 129*a* of FIG. 19.

Figure 20:
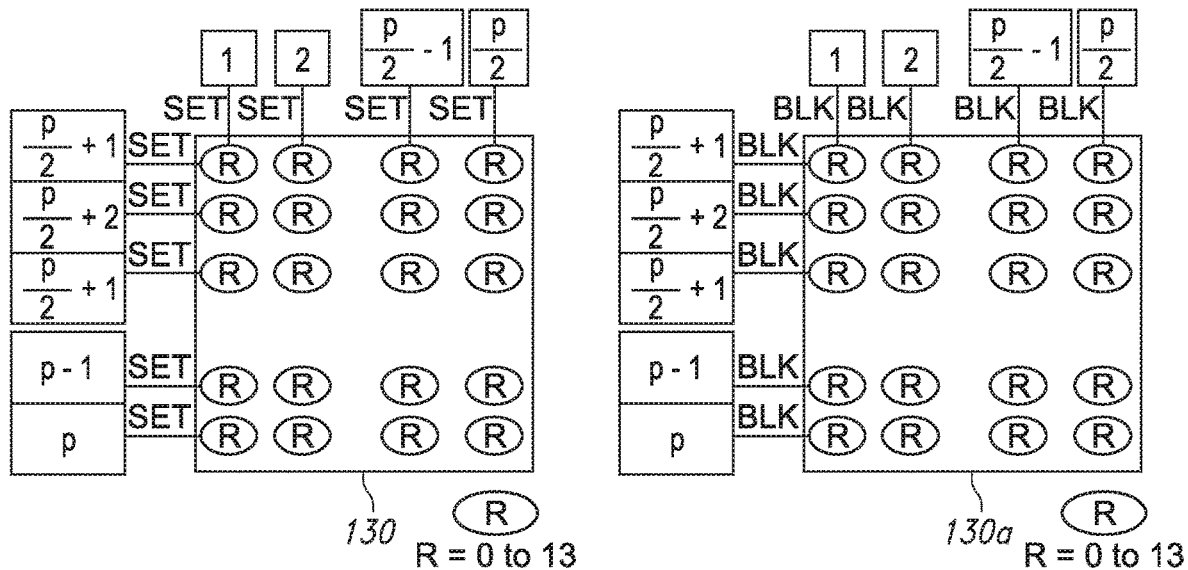
FIG. 20 illustrates an embodiment of generalized set allocation and block allocation connectivity for loaded cache memory cells.

FIG. 20 illustrates an embodiment of a generalized set allocation connectivity and block allocation connectivity for loaded cache cells. Set allocation connectivity matrix 130 and block allocation connectivity matrix 130*a* for cache memory cells are shown for p number of memory cells organized into $$\frac{p}{2}$$

cells horizontally and $$\frac{p}{2}$$

cells vertically with the set activation SET and block activation BLK on each of the cells. The connectivity organization uses the symbols illustrated in FIG. 19.

Figures 21, 22:
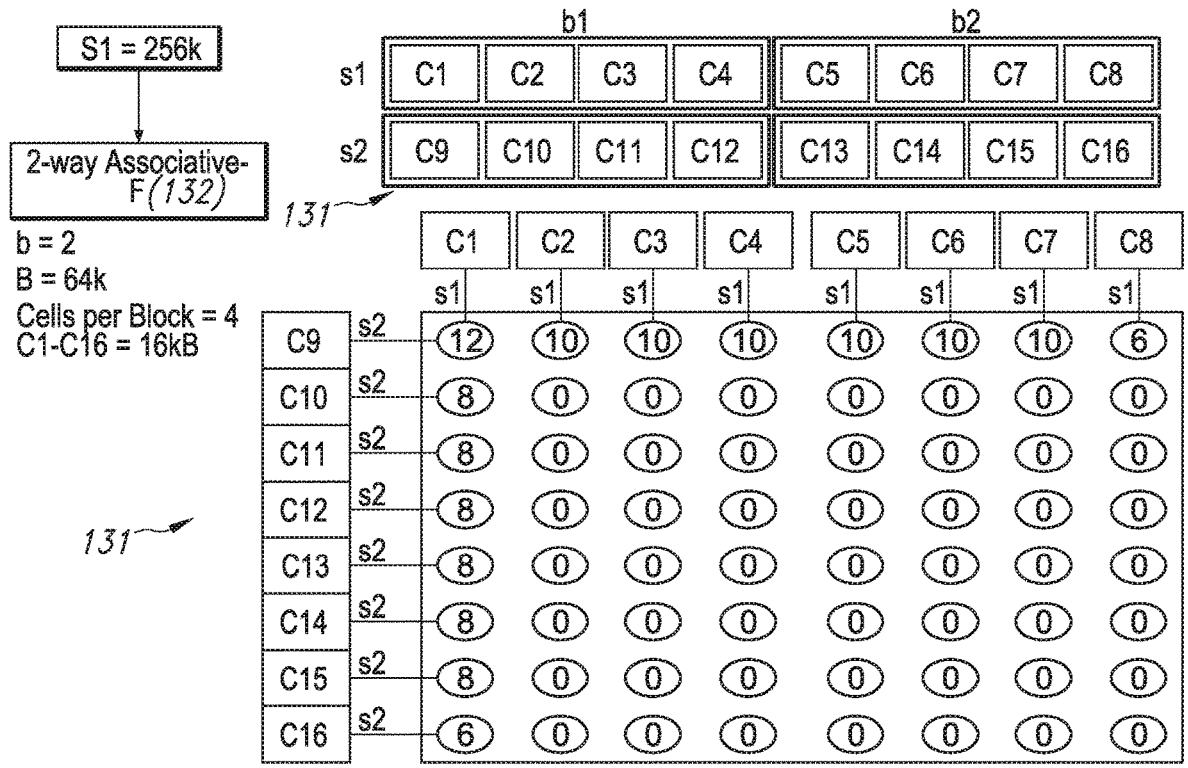
FIG. 21 illustrates an embodiment of set allocation connectivity for L1 loaded cache memory cells.
FIG. 22 illustrates an embodiment of set allocation table for L1 loaded cache memory cells.

FIGS. 21 through 28 illustrates various embodiments of set allocation connectivity and routing tables and block allocation connectivity matrix and the connectivity tables for L1, L2, and L3 loaded cache memory cells. FIG. 21 illustrates an embodiment of set allocation connectivity 131 for L1 loaded cache memory cells. In the illustrated example, S1=256k and the association for L1 cache corresponds to 2-way associative-floating (132). For illustration purposes, example values of b=2, B=64k, cells per block=4, and cell size of cells C1 to C16=16 kB have been considered. As shown, cells C1 to C8 correspond to cells organized horizontally and C9 to C16 correspond to cells organized vertically. Each cell connectivity symbol R can take values from 0 to 13 as shown in the set allocation connectivity matrix.

FIG. 22 illustrates an embodiment of set allocation table 132 corresponding to set allocation connectivity for L1 loaded cache memory cells as explained in FIG. 21.

Figures 23, 24:
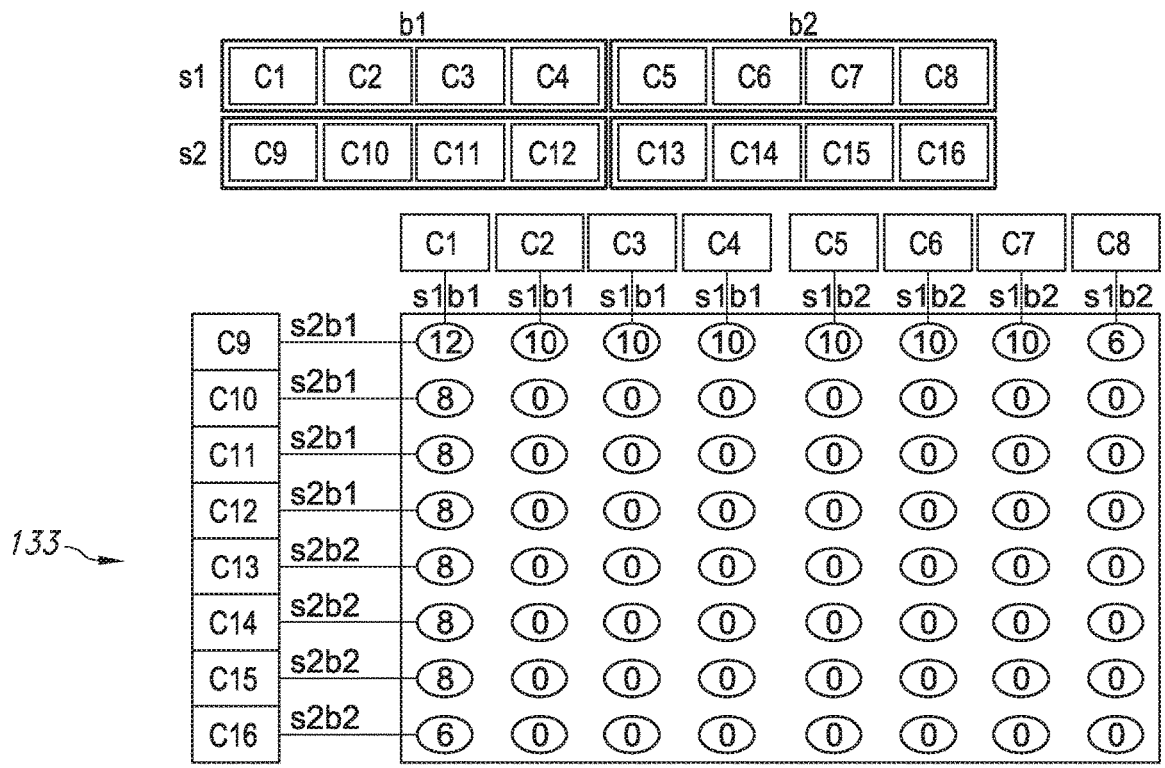
FIG. 23 illustrates an embodiment of block allocation connectivity for L1 loaded cache memory cells.
FIG. 24 illustrates an embodiment of block allocation connectivity table for L1 loaded cache memory cells.

FIG. 23 illustrates an embodiment of block allocation connectivity 133 for L1 loaded cache memory cells. FIG. 24 illustrates an embodiment of block allocation connectivity table 134 for L1 loaded cache memory cells.

Figure 25:
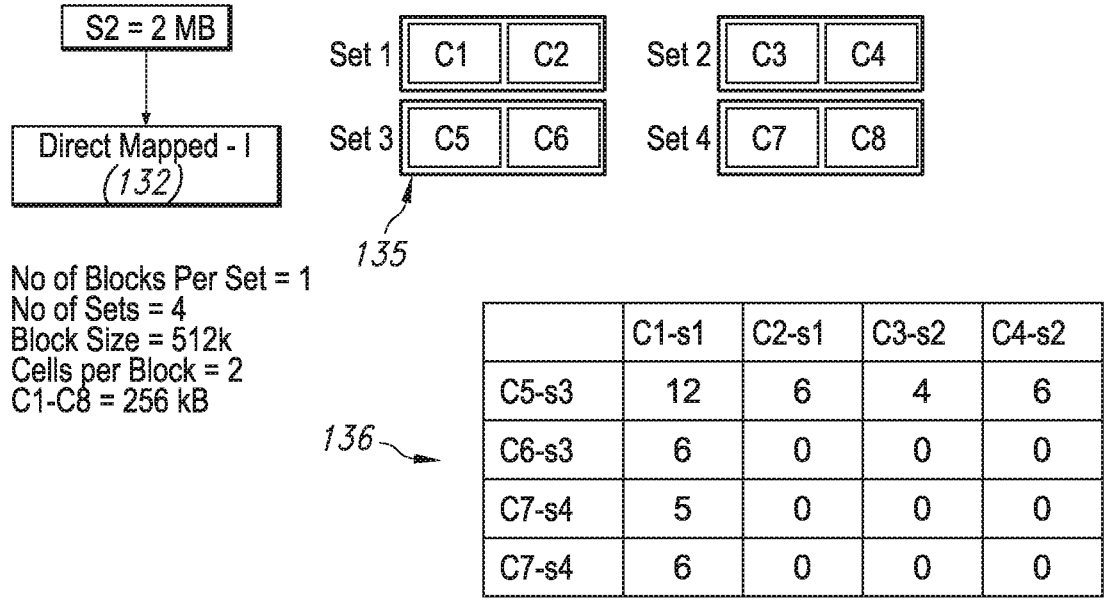
FIG. 25 illustrates an embodiment of set allocation connectivity table for L2 loaded cache memory cells.
Figure 26:
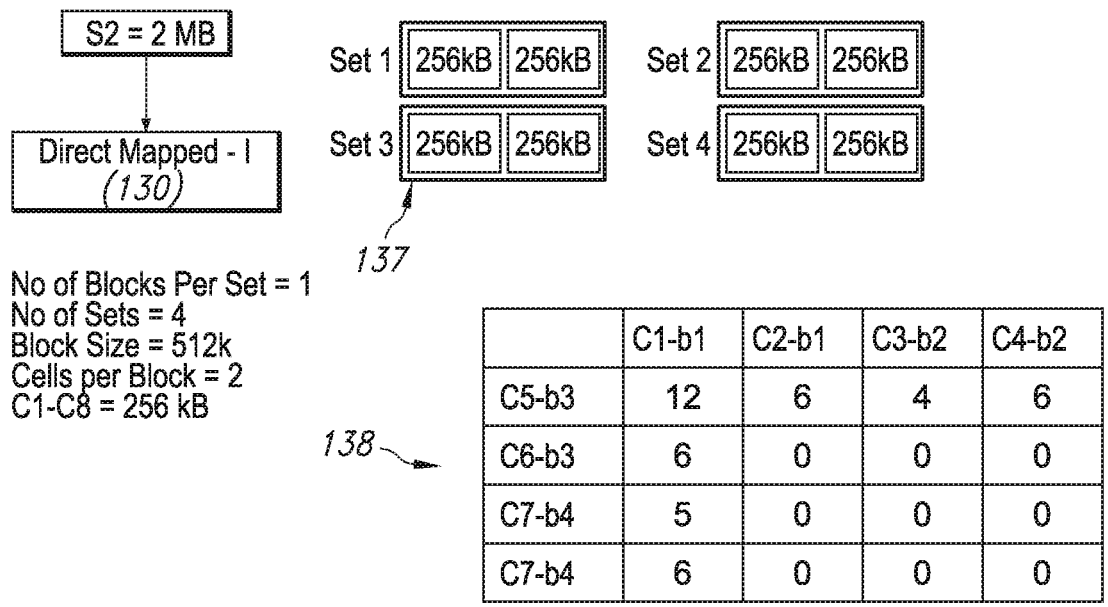
FIG. 26 illustrates an embodiment of block allocation connectivity table for L2 loaded cache memory cells.

FIG. 25 illustrates an embodiment of set allocation connectivity 135 and corresponding set allocation connectivity table 136 for L2 loaded cache memory cells. FIG. 26 illustrates an embodiment of block allocation connectivity 137 and corresponding block allocation connectivity table 138 for L2 loaded cache memory cells.

Figure 27:
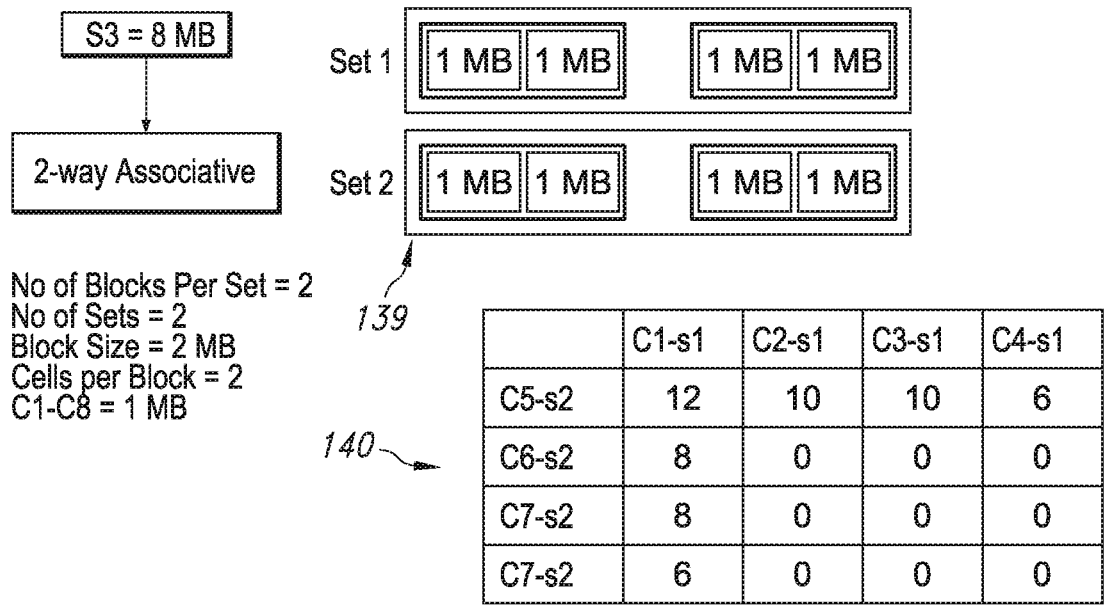
FIG. 27 illustrates an embodiment of set allocation connectivity table for L3 loaded cache memory cells.
Figure 28:
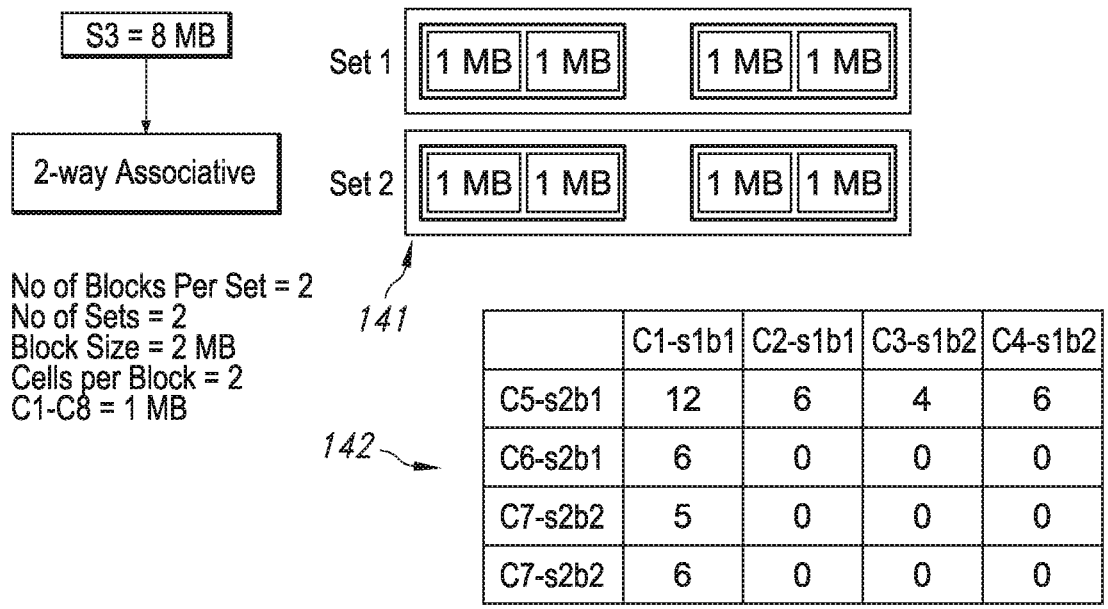
FIG. 28 illustrates an embodiment of block allocation connectivity table for L3 loaded cache memory cells.

FIG. 27 illustrates an embodiment of set allocation connectivity 139 and corresponding set allocation connectivity table 140 for L3 loaded cache memory cells. FIG. 28 illustrates an embodiment of block allocation connectivity 141 and corresponding block allocation connectivity table 142 for L3 loaded cache memory cells.

FIG. 29 depicts an embodiment of a method 143 for cache size reconfiguration. Referring to FIG. 29, the method for cache size reconfiguration includes the step (144) of extracting the data size from the application run time profiler 152. Next, at step 145, the extracted data size is presented to the reconfiguration control/distribution module (108). At step 146, the cache sizing in accordance with equations described in relation to FIG. 10 is derived as explained earlier. At step 147, the method involves dynamically loading of cells. At step 148, the cache association adaptation is performed and at step 149, the replacement policy adaptation is performed. The configuration in the reconfiguration control/distribution module register is executed at step 150. The current cache configuration state 164 from step 150 is presented to the application run time profiler 152. An application performance tracker 154 uses the performance threshold 163 and cache configuration state (from the application run time profiler 152) to determine if further reconfiguration is needed to keep the processor bandwidth constant. Accordingly, the application performance tracker 154 issues an enable/disable command via an interface 165 to a data size tracking 153 for the reconfiguration control and distribution module (108) to re-track the application data size to keep the processor bandwidth constant.

FIG. 30 depicts an embodiment of a method 166 for distributed cache capacity distribution. Referring to FIG. 30, the method for distributed cache sizing 166 includes reading the cache distribution type (local within the level or distributed across the levels) at step 167. If it is determined that cache is to be distributed 172, the method 166 proceeds to step 168. At step 168, the distribution factor for L1 cache memory is read. Next, at step 169, the capacity is distributed from L2 to L1 by reconfigurable interconnection 102 thereby enabling connectivity for the cells. Similarly, at step 170, the distribution factor for L2 is read and at step 171, the connectivity of cells is enabled by reconfigurable interconnection 102 by distributing capacity from L3 to L1. The flow of control in the method 166 is indicated by the directed arrows 172, 173, 174, and 175 in FIG. 30.

Figure 31:
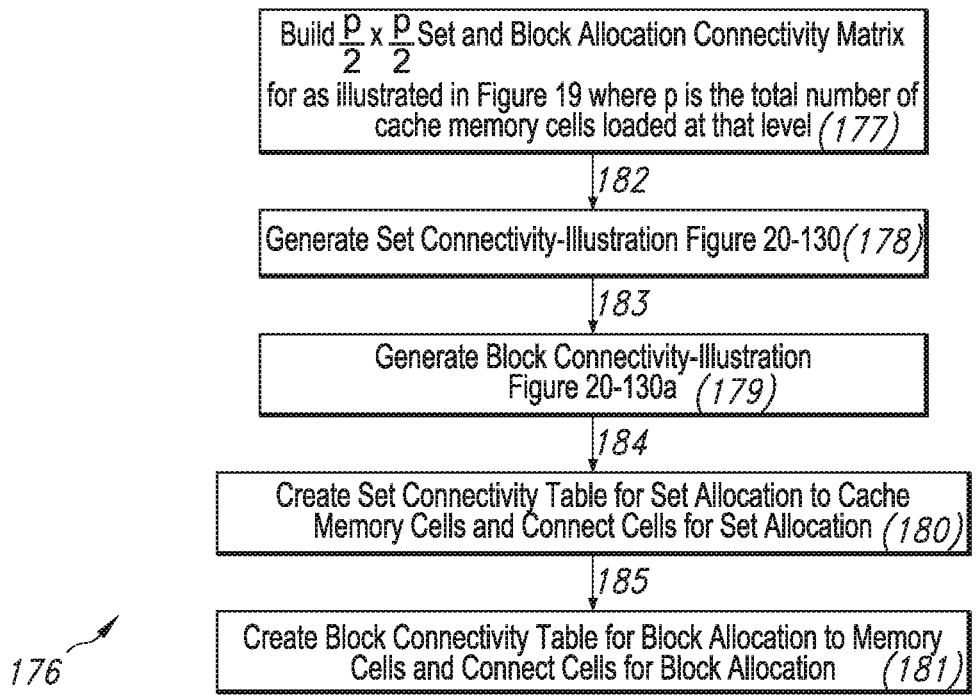
FIG. 31 depicts an embodiment of a method for cache association reconfiguration.

FIG. 31 depicts an embodiment of a method 176 for cache association reconfiguration. Referring to FIG. 31, the method 176 for cache association reconfiguration includes the step 177 of building a set and block allocation/association connectivity matrix as explained in connection with FIG. 19. This step involves building a $$\frac{p}{2} * \frac{p}{2}$$

set and block allocation connectivity matrix where p denotes the total number of cache memory cells loaded at a given level. At step 178, using this information set connectivity (e.g. 130) is generated as illustrated and explained in connection with FIG. 20. At step 179, the block connectivity (e.g. 130a) is generated as shown in FIG. 20. At step 180, the set and block connectivity are read and corresponding connectivity table for connection of set is created. Cache memory cells are accordingly connected for set allocation based on the set connectivity table. Similarly, at step 181, block connectivity table for block allocation to cache memory cells is created and cache memory cells are connected for corresponding block allocation to achieve the desired cache association.

Embodiment of a computer-implemented method for reconfiguration of a multi-level cache memory are disclosed. According to an embodiment, the method is implemented in a system comprising one or more processors (e.g. 100) coupled to the multi-level cache memory (e.g. 104). The method includes determining, in run-time, a current application data size (e.g. D) associated with an application being executed by the one or more processors. The method further includes deriving dynamically a cache sizing (e.g. S1, S2, S3) for one or more levels (e.g. L1, L2, L3) of multi-level cache memory based on a maximum loadable capacity (e.g. N1, N2, N3) of each cache level of the multi-level cache memory and the determined current application data size.

The method further includes loading cache memory cells of the multi-level cache memory 104 based on the derived cache sizing to obtain reconfigured cache sizing. In an embodiment, the method also includes performing cache association for the one or more levels of multi-level cache memory based on the reconfigured cache sizing. In yet another embodiment, the method includes applying one or more cache replacement policies for the one or more levels of multi-level cache memory based on the reconfigured cache sizing. In an embodiment, the method includes extracting the current application data size from an application profile. In yet another embodiment, the method includes tracking dynamic application performance to enable or disable a continuous tracking of the current application data size.

In still further embodiment, the method further includes distributing the cache sizing from a higher level cache (e.g. L3) to the next lower level cache (e.g. L2) in the multi-level cache memory. To this end, the method includes obtaining a plurality of distribution factors (e.g. k1, k2). The distributing of the cache sizing is based at least in part on the obtained plurality of distribution factors. In an embodiment, the higher level cache (e.g. L3) has a faster memory technology as compared to the next lower level cache (e.g. L2) of the multi-level cache memory 104. The performing of cache association includes providing a set allocation connectivity and a block allocation connectivity for cache memory cells in the multi-level cache memory to achieve a desired cache association. In an embodiment, the method further includes generating a cache association output vector that comprises a loaded capacity, a block size, an association type and a cell size per loaded size range for one or more cache levels in the multi-level cache memory.

In yet another embodiment, the method further includes generating a set connectivity routing table and a block connectivity routing table for each level of multi-level cache memory. The method further includes driving, for each level of the multi-level cache memory, cache memory cells set allocation and block allocation connections to achieve a desired cache association for each level of the multi-level cache memory. In still further embodiment, the method also includes obtaining a set allocation connectivity vector and a block allocation connectivity vector for each level of the multi-level cache memory. In addition, the method includes generating a connectivity table for each level of the multi-level cache memory for set and block allocation of cache memory cells for achieving desired cache association corresponding to each level of the multi-level cache.

By using a dynamically reconfigurable cache that tracks the cache size for application data size, disclosed systems and methods provide an optimum SWaP solutions for class of big data applications on embedded platforms. Such big computing can also find useful applications in future cyber-physical intelligent systems with lot of big data processing across system of systems. For instance, neuromorphic computing is biologically inspired computing in which computations mimic brain cells and the computational chips are built around it. Neuromorphic chips use ANNs in their architectural flexibility and allow for configuration of computational nodes and interconnections. These chips have wide applications in building cognitive computers that solve class of problems with big data applications from vision, auditory and multi-sensory fusion. Therefore, it is advantageous to implement an on-chip reconfigurable cache disclosed herein to support big data processing.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that various embodiments of the suspension device described herein contain optional features that can be individually or together applied to any other embodiment shown or contemplated here to be mixed and matched with the features of that device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A system for dynamic reconfiguration of cache, the system comprising:
 a plurality of processors;
 a plurality of memory modules executed by the plurality of processors;
 a dynamic reconfigurable cache comprising of a multi-level cache implementing a combination of an L1 cache, an L2 cache, and an L3 cache; and
 a reconfiguration control and distribution module configured to receive input including an application data size, a cache sizing type, and at least one distribution factor,
 wherein one or more of the L1 cache, the L2 cache, and the L3 cache are dynamically reconfigurable to one or more sizes based at least in part on the application data size associated with an application being executed by the plurality of processors, and
 wherein the reconfiguration control and distribution module is further configured to perform dynamic reconfiguration of the dynamic reconfigurable cache based on the input.

2. The system as claimed in claim 1, wherein relative maximum loadable sizes (N1, N2, N3) of the L1 cache, the L2 cache, and the L3 cache respectively satisfy $N3>N2>N1$.

3. The system as claimed in claim 1, wherein the dynamic reconfigurable cache is configured to track the application data size to dynamically reconfigure an association and a replacement policy for the dynamic reconfigurable cache.

4. The system as claimed in claim 1, wherein the dynamic reconfigurable cache is configured to provide an adaptable cache association to cache sizing for L1, L2 and L3 caches respectively.

5. The system as claimed in claim 1, wherein the dynamic reconfigurable cache is configured to provide an adaptable cache replacement policy for L1, L2 and L3 caches.

6. The system as claimed in claim 1, wherein one or more cache memory cells in the dynamic reconfigurable cache are distributed from a higher cache level to a lower cache level by connecting one or more levels of the multi-level cache.

7. The system as claimed in claim 1 further comprises a reconfigurable interconnection configured to connect one or more levels of multi-level cache with one or more other levels of multi-level cache to distribute one or more cache memory cells from a higher cache level to a lower cache level in the dynamic reconfigurable cache.

8. The system as claimed in claim 6, wherein L2 loaded cache capacity is distributed to expand L1 loaded cache by a first distribution factor $$\frac{1}{k1}$$

and L3 loaded cache capacity is distributed to expand L2 loaded cache by a second distribution factor $$\frac{1}{k2}.$$

9. A computer-implemented method for reconfiguration of a multi-level cache memory, the method comprising:
   in a system comprising one or more processors coupled to the multi-level cache memory,
   determining, in run-time, a current application data size associated with an application being executed by the one or more processors;
   deriving dynamically a cache sizing for one or more levels of multi-level cache memory based on a maximum loadable capacity of each cache level of the multi-level cache memory and the determined current application data size;
   loading cache memory cells of the multi-level cache memory based on the derived cache sizing to obtain reconfigured cache sizing;
   performing cache association for the one or more levels of multi-level cache memory based on the reconfigured cache sizing;
   applying one or more cache replacement policies for the one or more levels of multi-level cache memory based on the reconfigured cache sizing; and
   generating a cache association output vector that comprises a loaded capacity, a block size, an association type and a cell size per loaded size range for one or more cache levels in the multi-level cache memory.

10. The method as claimed in claim 9 further comprises extracting the current application data size from an application profile.

11. The method as claimed in claim 9 further comprises tracking dynamic application performance to enable or disable a continuous tracking of the current application data size.

12. The method as claimed in claim 9 further comprises distributing the cache sizing from a higher level cache to the next lower level cache in the multi-level cache memory.

13. The method as claimed in claim 12 further comprises obtaining a plurality of distribution factors, wherein the distributing of the cache sizing is based at least in part on the obtained plurality of distribution factors.

14. The method as claimed in claim 12, wherein the higher level cache has a faster memory technology as compared to the next lower level cache of the multi-level cache memory.

15. The method as claimed in claim 9, wherein performing cache association comprises providing a set allocation connectivity and a block allocation connectivity for cache memory cells in the multi-level cache memory to achieve a desired cache association.

16. The method as claimed in claim 9 further comprising:
   generating a set connectivity routing table and a block connectivity routing table for each level of multi-level cache memory; and
   driving, for each level of the multi-level cache memory, cache memory cells set allocation and block allocation connections to achieve a desired cache association for each level of the multi-level cache memory.

17. The method as claimed in claim 16 further comprises:
   obtaining a set allocation connectivity vector and a block allocation connectivity vector for each level of the multi-level cache memory; and
   generating a connectivity table for each level of the multi-level cache memory for set and block allocation of cache memory cells for achieving desired cache association corresponding to each level of the multi-level cache.

18. A system for dynamic reconfiguration of cache, the system comprising:
   a dynamic reconfigurable multi-level cache; and
   a reconfiguration control and distribution module configured to receive input including an application data size, a cache sizing type, and at least one distribution factor, wherein the reconfiguration and distribution module is further configured to dynamically reconfigure sizing of the dynamic reconfigurable multi-level cache based at least in part on an application data size associated with an application being executed.

19. The system as claimed in claim 18, further comprising a reconfigurable interconnection configured to create a distributed multi-level cache by organizing a plurality of cache memory cells from a higher level cache into a lower level cache for expansion of the lower level cache in the dynamic reconfigurable multi-level cache.

20. The system as claimed in claim 18, further comprising:
   a cache association output vector driven by the reconfiguration control and distribution module and comprising a loaded capacity, a block size, an association type and a cell size per loaded size range for one or more cache levels in the multi-level cache memory.

* * * * *